United States Patent
Nogi et al.

[11] Patent Number: 5,140,965
[45] Date of Patent: Aug. 25, 1992

[54] SYSTEM FOR AND METHOD OF SUPPLYING FUEL TO INTERNAL COMBUSTION ENGINE

[75] Inventors: Toshiharu Nogi; Yoshishige Ohyama; Minoru Ohsuga, all of Katsuta; Mamoru Fujieda, Ibaraki, all of Japan

[73] Assignee: Hitachi, Ltd., Tokyo, Japan

[21] Appl. No.: 686,365

[22] Filed: Apr. 17, 1991

[30] Foreign Application Priority Data

Apr. 17, 1990 [JP] Japan .................. 2-099380
May 1, 1990 [JP] Japan .................. 2-115596
Sep. 13, 1990 [JP] Japan .................. 2-241226

[51] Int. Cl.⁵ .......................... F02M 51/00
[52] U.S. Cl. .................. 123/494; 123/1 A
[58] Field of Search ............... 123/494, 1 A

[56] References Cited

U.S. PATENT DOCUMENTS

| | | | |
|---|---|---|---|
| 4,594,968 | 6/1986 | Degobart et al. | 123/1 A |
| 4,706,629 | 11/1987 | Wineland et al. | 123/1 A |
| 4,706,630 | 11/1987 | Wineland et al. | 123/1 A |
| 4,770,129 | 9/1988 | Miyada et al. | 123/1 A |
| 4,905,654 | 3/1990 | Katsuno et al. | 123/494 |
| 4,905,655 | 3/1990 | Maekawa | 123/494 |
| 4,909,225 | 3/1990 | Gonze et al. | 123/494 |
| 4,945,880 | 8/1990 | Gonze et al. | 123/494 |
| 4,957,088 | 9/1980 | Hosaka | 123/494 |
| 4,962,746 | 10/1990 | Miyata et al. | 123/1 A |
| 4,967,714 | 11/1990 | Inoue | 123/1 A |
| 4,971,015 | 11/1990 | Gonze | 123/494 |
| 4,974,552 | 12/1990 | Sickafus | 123/494 |
| 4,982,709 | 1/1991 | Oota | 123/1 A |
| 4,986,241 | 1/1991 | Inoue et al. | 123/1 A |

Primary Examiner—Raymond A. Nelli
Attorney, Agent, or Firm—Antonelli, Terry, Stout & Kraus

[57] ABSTRACT

In an engine using various kinds of fuels, the nature of the fuel to be supplied to the engine is detected, and based on this detection result, a theoretical air-fuel ratio is found. Then, using it as a target air-fuel ratio, the amount of supply of the fuel is controlled, and therefore even when the nature of the fuel is changed, an accurate air-fuel ratio control can be made.

39 Claims, 34 Drawing Sheets

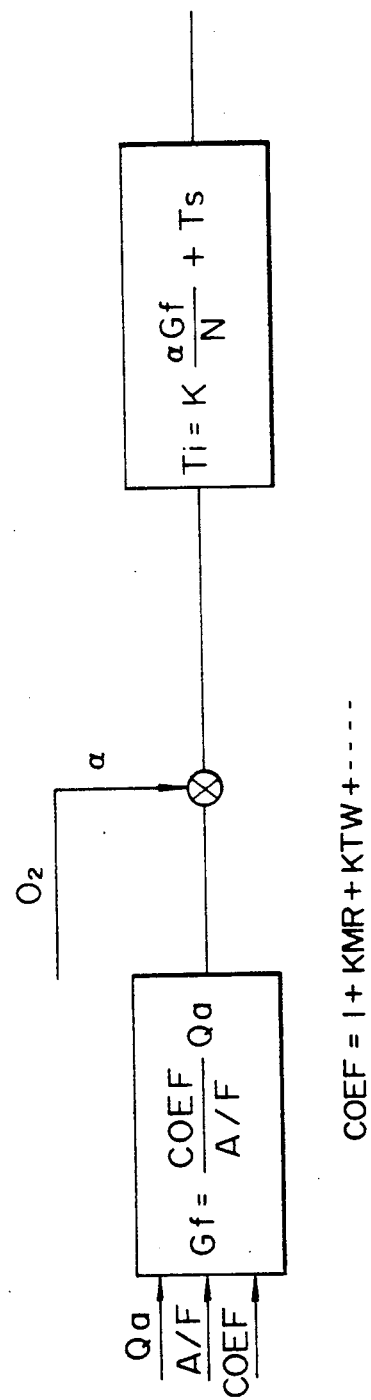

| SENSOR OUTPUT : Vf | 0~0.3V | 0.3~0.6V | ----- |
|---|---|---|---|
| THEORETICAL AIR-FUEL RATIO | A/F 1 | A/F 2 | |

FIG. 19
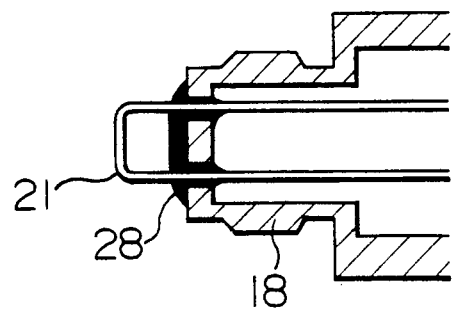
FIG. 20A
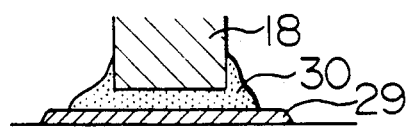
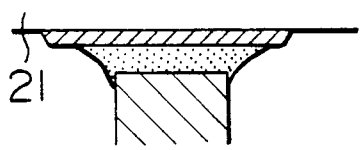
FIG. 20B
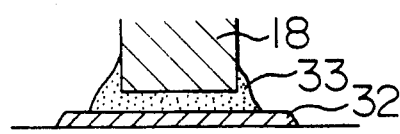
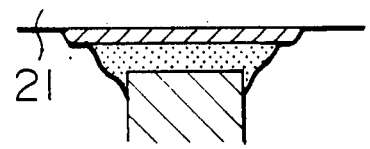
FIG. 20C
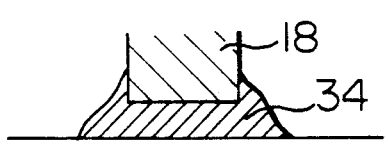
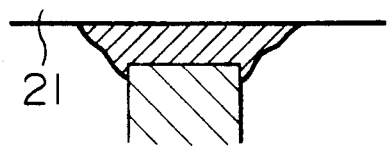
FIG. 20D
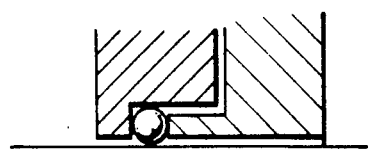
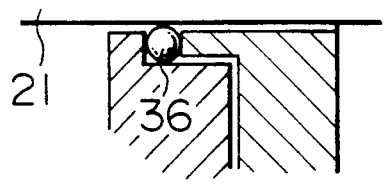

| VOLTAGE | 0.16 | 0.32 | 0.48 | ----- | 2.56 |
|---|---|---|---|---|---|
| THEORETICAL AIR-FUEL RATIO | 6.5 | 6.5 | 6.5 | ----- | 14.7 |

| VOLTAGE | 0.16 | 0.32 | 0.48 | ----- | 2.56 |
|---|---|---|---|---|---|
| METHANOL CONCENTRATION | 0 | 0 | 0 | ----- | 100 |

SYSTEM FOR AND METHOD OF SUPPLYING FUEL TO INTERNAL COMBUSTION ENGINE

BACKGROUND OF THE INVENTION

This invention relates to a system for and a method of supplying fuel to an internal combustion engine mounted on an automobile.

In view of the emission which result from the burning of a petrochemical fuel and inefficiencies in the purification of exhaust gas, there has been an increasing interest in the type of internal combustion engine which uses, as a fuel, a mixture of gasoline and alcohol, such as methanol and ethanol, or uses a fuel such as alcohol instead of gasoline. One such engine is disclosed in Japanese Patent Unexamined Publication No. 62-243937.

In the above mentioned publication, consideration is not given to specific control for dealing with the case where fuel is changed from a mixed fuel of methanol and gasoline to a mixed fuel to ethanol and gasoline, and the case where the nature of the gasoline itself is greatly changed. Therefore, this proposed solution has a problem that it can not provide a system for satisfactorily effecting an accurate air-fuel ratio control.

And besides, a fuel sensor is known to become deteriorated upon lapse of time, so that its output is changed; however, there has not been proposed any specific means for detecting and correcting such changes. A fuel injection valve is also deteriorated upon lapse of time, and fails to supply fuel to an engine in accordance with a predetermined injection pulse duration or width; however, no means is provided for dealing with this problem. Further, when the octane value of gasoline in the mixed fuel is different, it is necessary to control the exhaust gas to a theoretical air-fuel ratio; however, no means is provided for dealing with this.

Not only in the case of using mixed fuel composed, for example, of alcohol and gasoline, but also in the case of using only gasoline as fuel, a fuel injection valve is usually mounted to be directed toward an intake valve. The direction of injection of the fuel from the fuel injection valve is in agreement with the direction of mounting of the fuel injection valve in the absence of any there is no influence by the air flowing through an intake pipe. Incidentally, the velocity of the air flowing through the intake pipe varies in accordance with the operating condition of the internal combustion engine. This velocity is low in a low-load operating condition of the engine, and is high in a high-load operating condition. Therefore, in actual practice, in the high-load operating condition, the direction of injection of the fuel from the fuel injection valve is affected by the air flow, and therefore is changed. Namely, the fuel injected from the fuel injection valve in the low-load operating condition is supplied to the intake valve, without being deflected by the air flow. On the other hand, in the high-load operating condition, there is encountered a problem that the fuel from the fuel injection valve is deflected by the air flow, so that the fuel is supplied out of registry with the intake valve.

SUMMARY OF THE INVENTION

It is a first object of this invention to provide an internal combustion engine control system which can always effect an accurate air-fuel ratio control even if the nature of the fuel varies, and eliminates a bad exhaust gas condition and possible worsening of the operation.

A second object of the invention is to provide an engine control method and system which enable an accurate air-fuel ratio control even when a fuel injection valve is deteriorated.

A third object of the invention is to provide a fuel injection device by which, in view of the influence of the air (which flows through an intake pipe) on the direction of fuel injection, the fuel is injected toward an intake valve even in a high-load operating condition of the engine, thereby achieving a stable combustion.

To achieve the first object, according to a first aspect of the invention, the nature of fuel to be supplied to an engine is detected, and based on this detection result, a theoretical air-fuel ratio corresponding to the fuel used at this time is found. Then, using it as a target air-fuel ratio, the amount of supply of the fuel is controlled.

To achieve the second object, according to a second aspect of the invention, mixed fuel of a plurality of kinds of fuels is supplied from a fuel injection valve to an engine; the amount of supply of the mixed fuel to the engine is feedback-controlled in such a manner that an air-fuel ratio of an exhaust gas is brought to a theoretical air-fuel ratio; a mixture percentage Ms of the mixed fuel to be supplied to the engine is detected by a fuel nature sensor; a mixture percentage $Mo_2$ during the feedback control is found from the air-fuel ratio of the exhaust gas; it is judged whether the value of a feedback coefficient $\alpha$ is smaller than, equal to or larger than 1 if $Ms < Mo_2$ is obtained; and the amount of supply of the fuel from the fuel injection valve is corrected at the time of the air-fuel ratio control if $\alpha > 1$ is obtained, judging that the fuel injection valve is deteriorated.

To achieve the third object, according to a third aspect of the invention, there is provided a fuel injection device comprising a fuel injection valve fixedly mounted on an intake pipe so as to inject at least one jet of atomized fuel toward an intake valve; and direction control means for controlling the direction of injection of the atomized fuel jet from the fuel injection valve in at least one of a low-load operating condition and a high-load operating condition of an engine whereby the atomized fuel jet is directed toward generally the same position on the intake valve in both of the low-load and high-load operating conditions.

BRIEF DESCRIPTION OF THE DRAWINGS

FIG. 3 is a control block diagram;

FIG. 19 is view showing a seal construction for the fuel nature sensor;

FIGS. 20A to 20D are views showing other seal constructions for the fuel nature sensors, respectively;

DETAILED DESCRIPTION OF THE PREFERRED EMBODIMENTS

Preferred embodiments of the invention for achieving the first object will now be described in detail with reference to the drawings.

Figure 1:
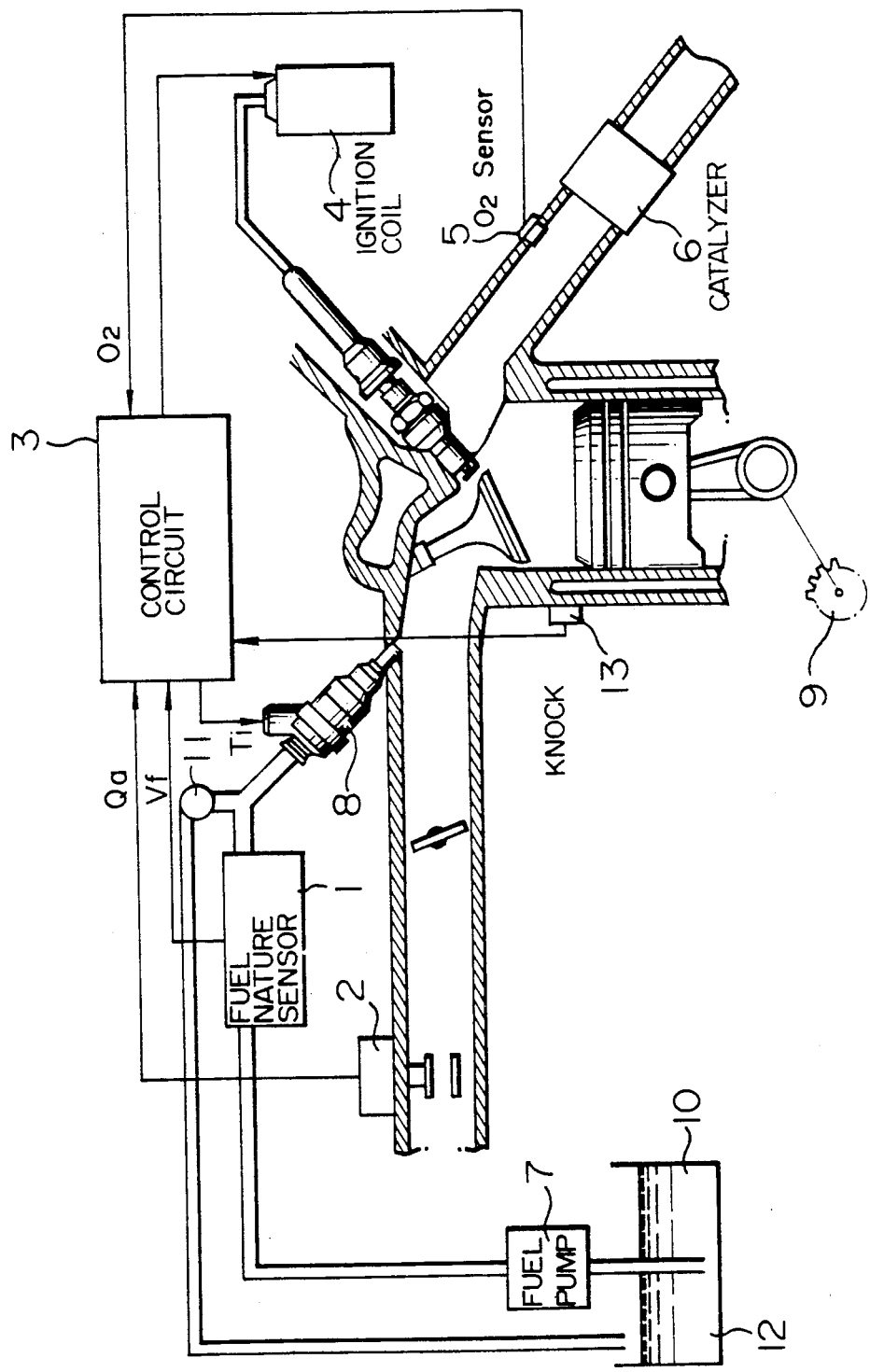
FIG. 1 is a schematic view of one preferred embodiment of an internal combustion engine control system of the present invention for achieving the first object.

FIG. 1 shows one preferred embodiment of the present invention. In FIG. 1, fuel 10 is pressurized by a fuel pump 7, and is supplied to a fuel injection valve 8. Part of the fuel is returned to a fuel tank 12 via a pressure regulator 11.

A fuel nature sensor 1 is provided between the fuel pump 7 and the fuel injection valve 8.

The fuel injection valve 8 intermittently injects the fuel, and the amount of injection of the fuel from this valve is controlled by a control circuit 3. Reference numerals 4 and 6 respectively denote an ignition coil and a catalyzer.

Figure 2:
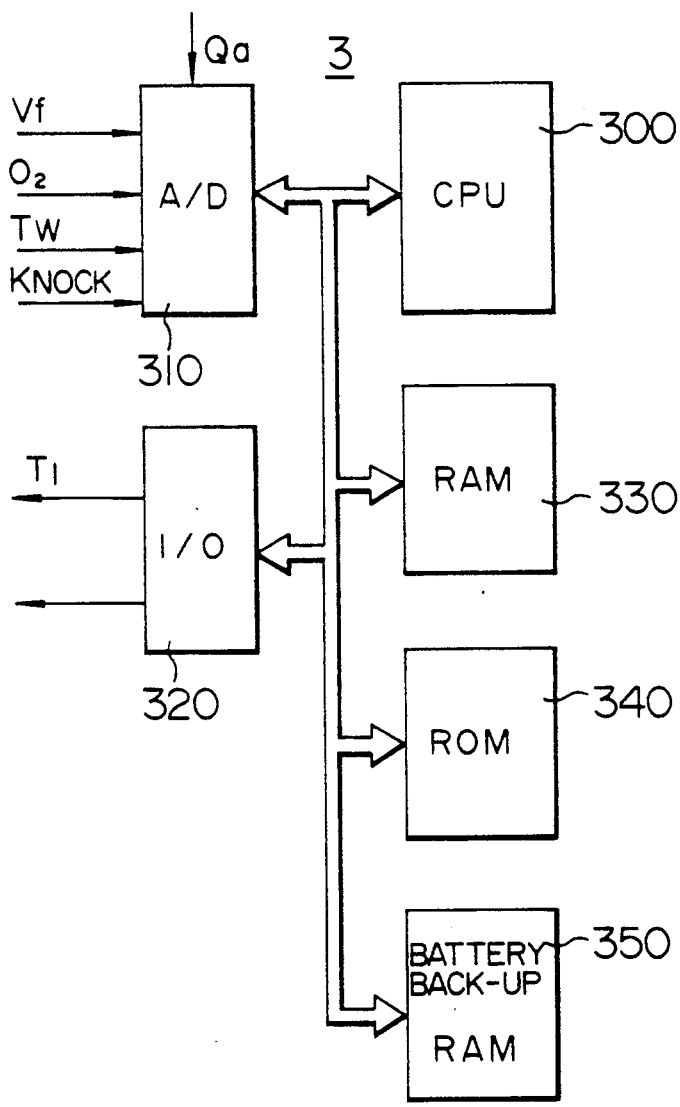
FIG. 2 is a block diagram of a control circuit.

FIG. 2 shows the construction of the control circuit 3. The control circuit 3 is provided with a computer comprising CPU (central processing unit) 300, A/D converter 310, I/0 port 320, RAM 330, ROM 340, and RAM 350 backed up by a battery. Analog signals, such as a signal Vf from the fuel nature sensor 1, a signal $O_2$ from $O_2$ sensor 5 mounted on an exhaust pipe, a signal Tw from a water temperature sensor (not shown), a signal Knock from a knock sensor 13 and a signal Qa from an airflow meter 2, are inputted to the CPU 300 via the A/D converter 310. The CPU outputs the results of calculation of these signals via the I/0 port 320 so as to control the injection valve 8 and etc.

FIG. 3 shows a block diagram for control of the fuel injection amount.

The amount Gf of the fuel supplied from the fuel injection valve 8 is expressed as follows:

$$Gf = \frac{COEF}{A/F} \cdot Qa \tag{1}$$

where Qa represents the air amount obtained by the airflow meter 2, A/F represents a theoretical air-fuel ratio, COEF=1+KMR+KTW+KMR represents an air-fuel ratio map, and KTW represents a water temperature compensation map.

Therefore, an injection pulse duration Ti supplied to the fuel injection valve 8 from the control circuit 3 is expressed as follows:

$$Ti = K \cdot \frac{aGf}{N} - Ts \qquad (2)$$

where K represents a constant determined by the flow characteristics of the fuel injection valve, Ts represents a reactive injection pulse, and N represents the engine speed.

Here, assuming that the fuel is composed solely of gasoline, the theoretical air-fuel ratio A/F is about 15, and therefore the injection pulse duration is determined only by N, Qa and COEF.

In mixed fuel of gasoline and methanol, the theoretical air-fuel ratio of gasoline is 15 whereas the theoretical air-fuel ratio of methanol is about 7, and therefore it is necessary to supply the fuel of an amount about twice that of gasoline.

Thus, with respect to any fuel, if the theoretical air-fuel ratio A/F of this fuel can be detected, the injection pulse duration, that is, the amount of fuel supply, can always be optimally controlled. Therefore, in this embodiment, the theoretical air-fuel ratio A/F is found in accordance with the nature of the fuel, thereby controlling the fuel supply amount.

Figures 4A, 4B:
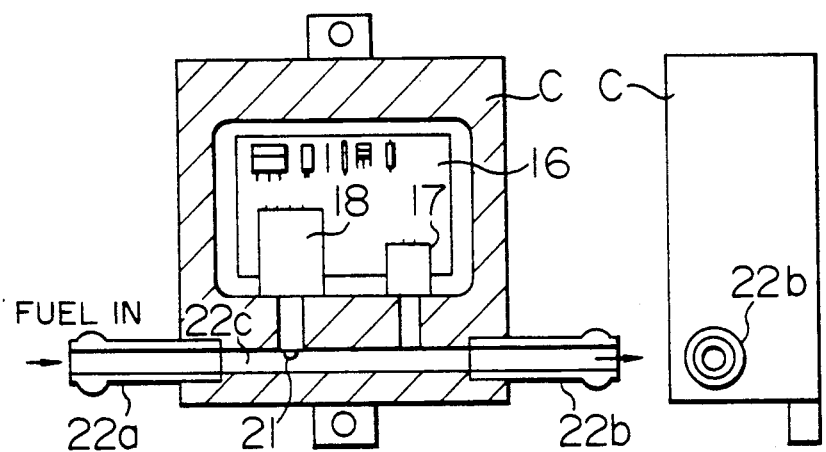
FIGS. 4A and 4B are views showing one example of a fuel nature or property sensor.

FIGS. 4A and 4B show one example of fuel nature sensor 1. FIG. 4A is a front-elevational view thereof, and FIG. 4B is a side-elevational view thereof.

As is clear from these FIGS. this fuel nature sensor 1 comprises a detection circuit 16, a sensor portion body 18 and a temperature sensor 17, and these parts are accommodated within a casing C. The fuel flows from a fuel passage 22a into a fuel passage 22c within the sensor, and is supplied to the fuel injection valve 8 via a fuel passage 22b.

Figure 5:
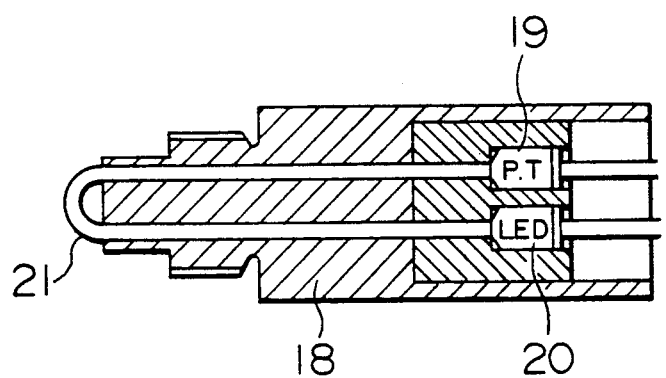
FIG. 5 is a view of a sensor portion.

FIG. 5 shows the construction of the sensor portion body 18. The sensor portion body 18 comprises a light receiving-element 19 such as a photodiode, a light-emitting element 20 such as a light-emitting diode, and a U-shaped optical fiber 21 optically connecting these elements together. The U-shaped turn portion (bent portion) of the optical fiber 21 is dipped in the fuel flowing from the fuel passage 22a via the fuel passage 22c to the fuel passage 22b.

Light emitted from the light-emitting element 20 passes through the optical fiber 21 to reach the light-receiving element 19. At this time, since the U-shaped turn portion of the optical fiber 21 is dipped in the fuel, the amount of leakage of the light from the optical fiber 21 varies in accordance with the refractive index of the fuel, so that the amount of the light reaching the light-receiving element 19 is varied.

With respect to the refractive index of the fuel, the refractive index of gasoline is different from that of alcohol. Therefore, depending on whether the fuel is composed solely of gasoline, or of a mixture of gasoline and alcohol, and also on the mixture ratio thereof, the refractive index of the fuel varies. Therefore, by detecting the amount of light detected by the light-receiving element 19, the mixture ratio of the fuel can be detected.

Figure 6:
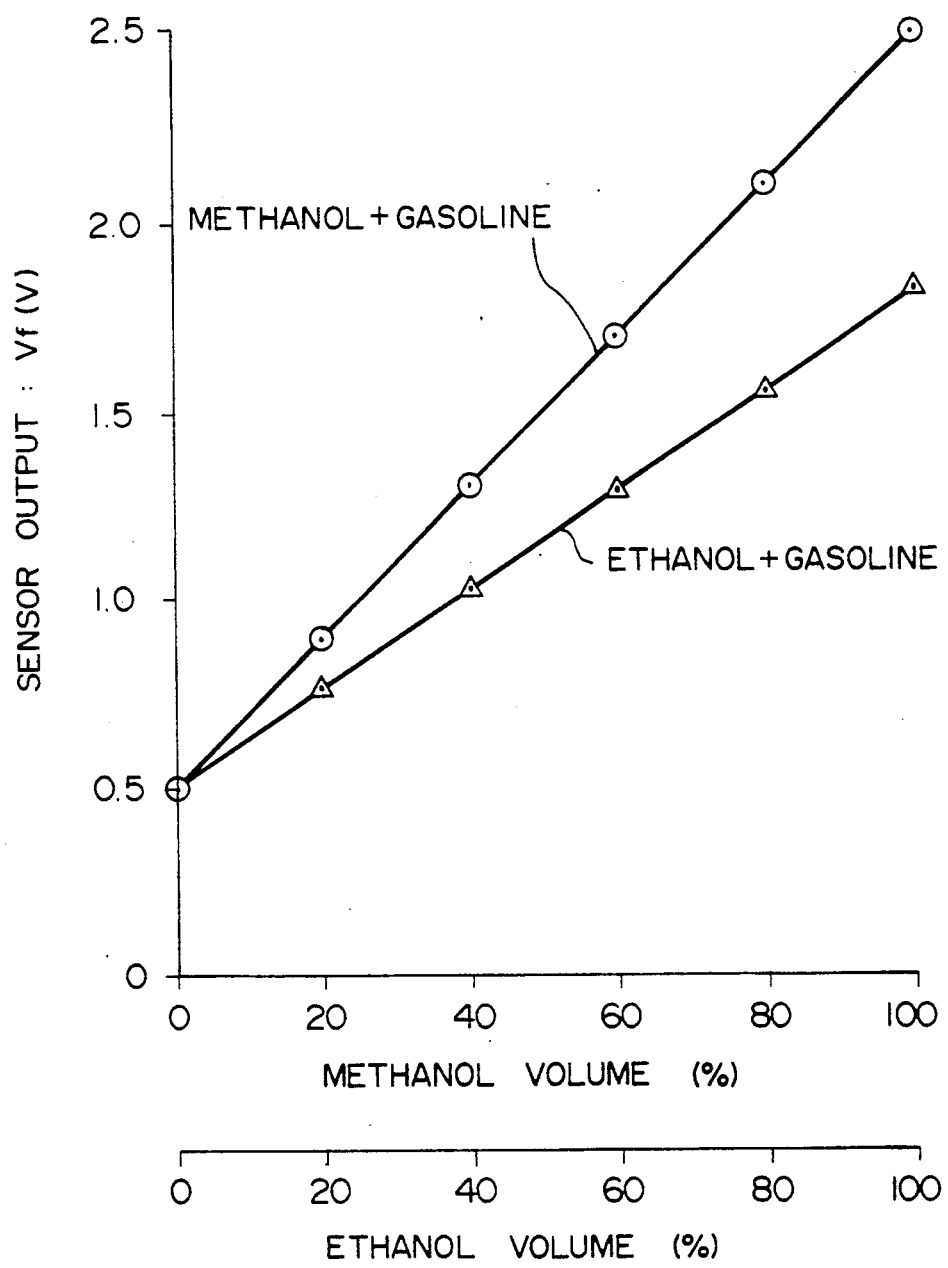
FIGS. 6 to 9 are illustrations explanatory of the operations.

FIG. 6 shows the relation between the sensor output Vf and the alcohol mixture percentage.

As is clear from FIG. 6, as the volume of ethanol increases, the refractive index of the liquid decreases, and therefore the amount of leakage of the light from the optical fiber 21 decreases, so that the sensor output Vf increases.

In this case, since ethanol is different in refractive index from methanol, the sensor output Vf, obtained when using the mixed fuel of gasoline and ethanol, is different from the sensor output Vf obtained when using the mixed fuel of gasoline and methanol.

Incidentally, even if the fuel nature sensor is used in the prior system, the fuel correction COEFs must be prepared for methanol and ethanol, respectively, so as to effect the control by switching from one to the other, because the coefficient COEF mentioned with reference to FIG. 3 is corrected in accordance with the sensor output Vf. And besides, it is necessary to distinguish methanol from ethanol. Therefore, in the prior art, the signal processings and its construction become complicated, and a practical use is difficult.

Therefore, as described above, in this embodiment, the theoretical air-fuel ratio A/F is found in accordance with the nature of the fuel, thereby controlling the fuel supply amount. The operation of this embodiment will now be described in further detail.

Figure 7:
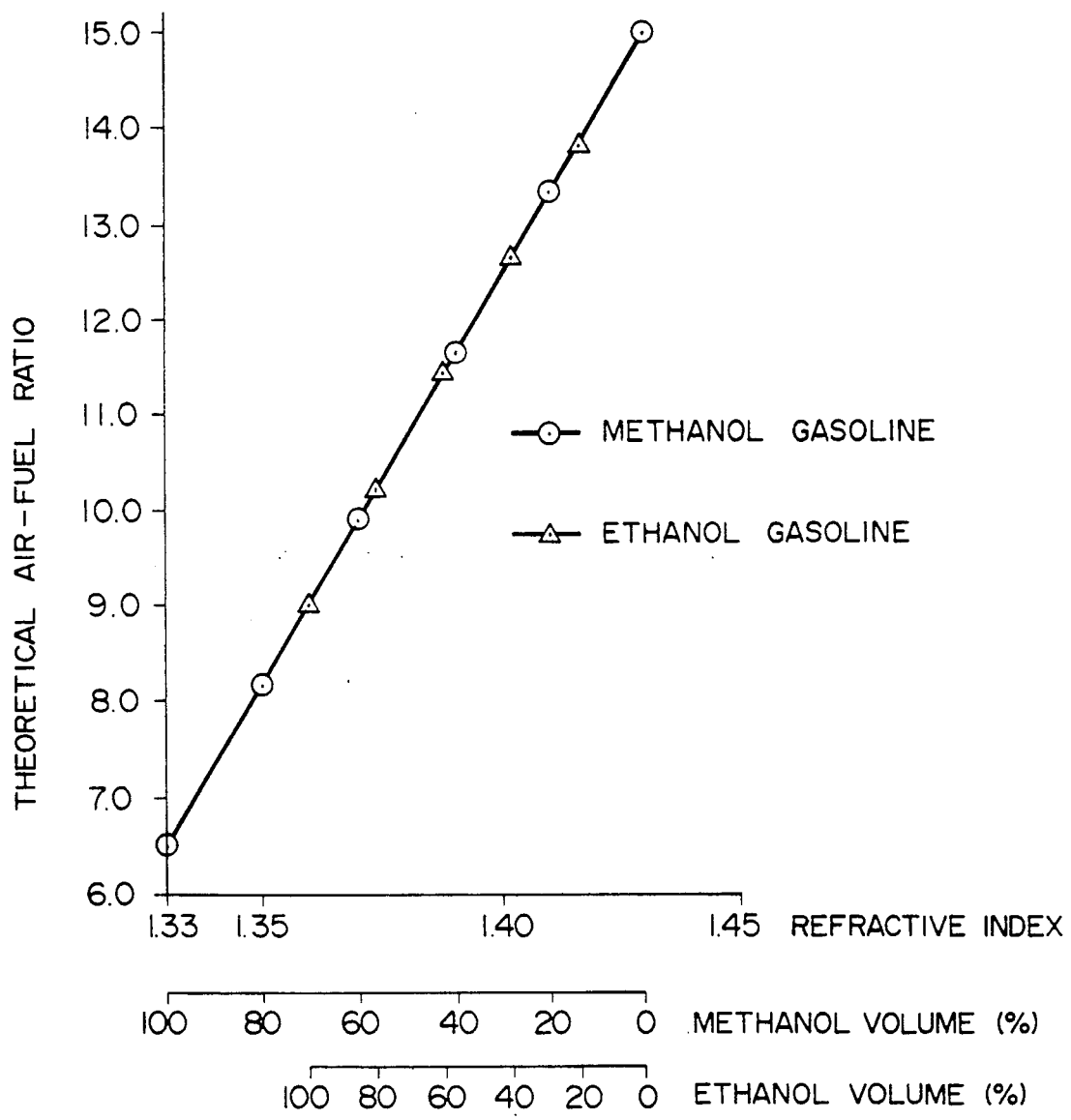
Figure 8:
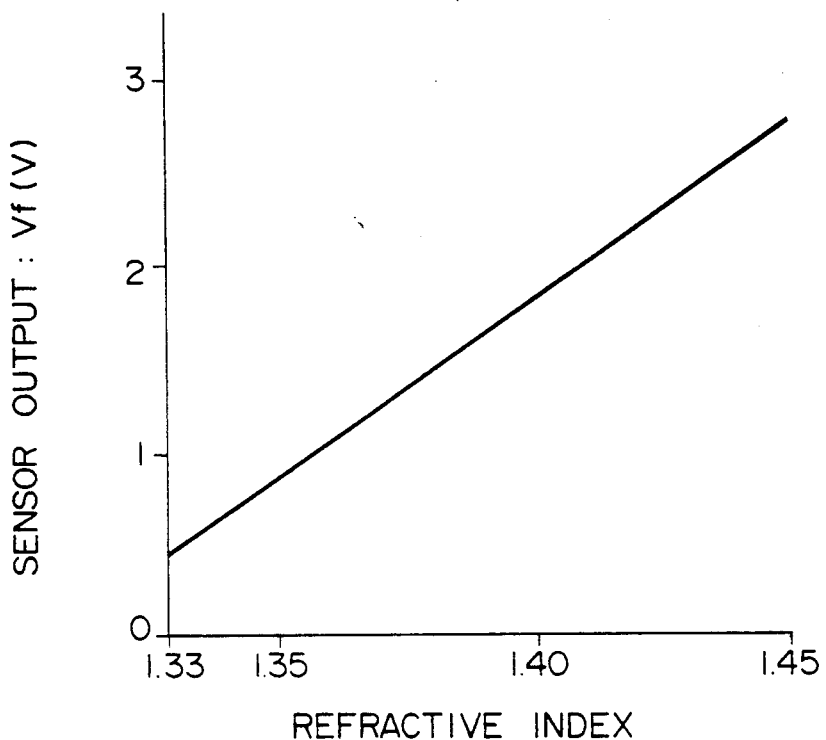

FIG. 7 shows the relation between the refractive index of the fuel and the theoretical air-fuel ratio thereof. As is clear from FIG. 7, the relation between the refractive index and the theoretical air-fuel ratio is generally linear, and also it has been found that this relation with respect to either of the methanol-mixed fuel and the ethanol-mixed fuel can be represented by one straight line. On the other hand, it can be seen from FIG. 8 that the relation between the refractive index of the fuel and the sensor output Vf is also linear.

Figure 9:
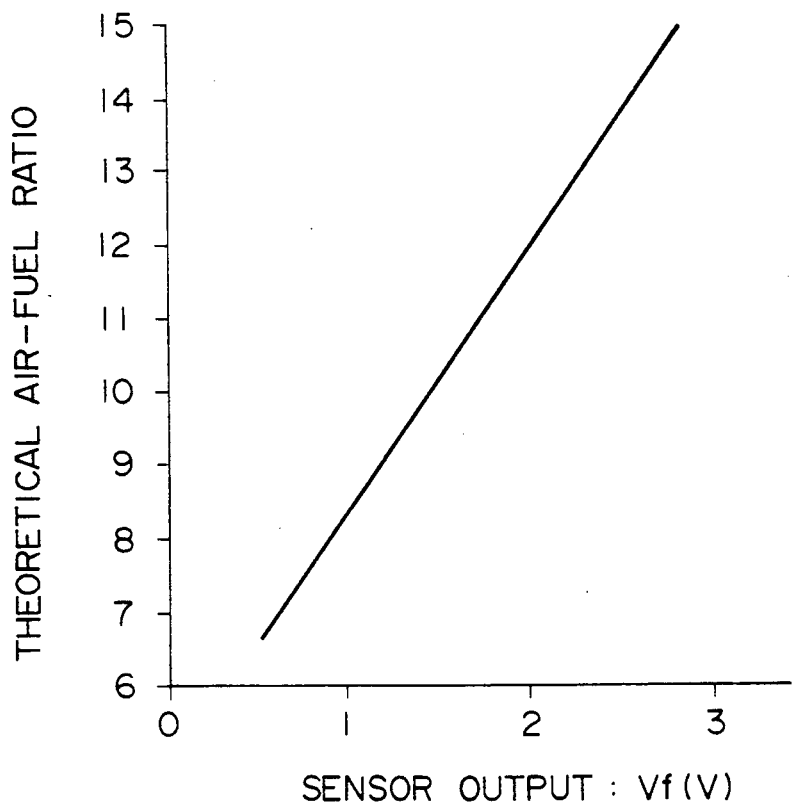

Therefore, when the relation between the sensor output Vf and the theoretical air-fuel ratio is found from these, this is represented as shown in FIG. 9, and the theoretical air-fuel ratio can be immediately found by the sensor output Vf. Namely, merely by changing A/F (shown in the block diagram of FIG. 3) in accordance with the sensor output Vf, the optimum fuel control can always be carried out.

Figures 10, 11:
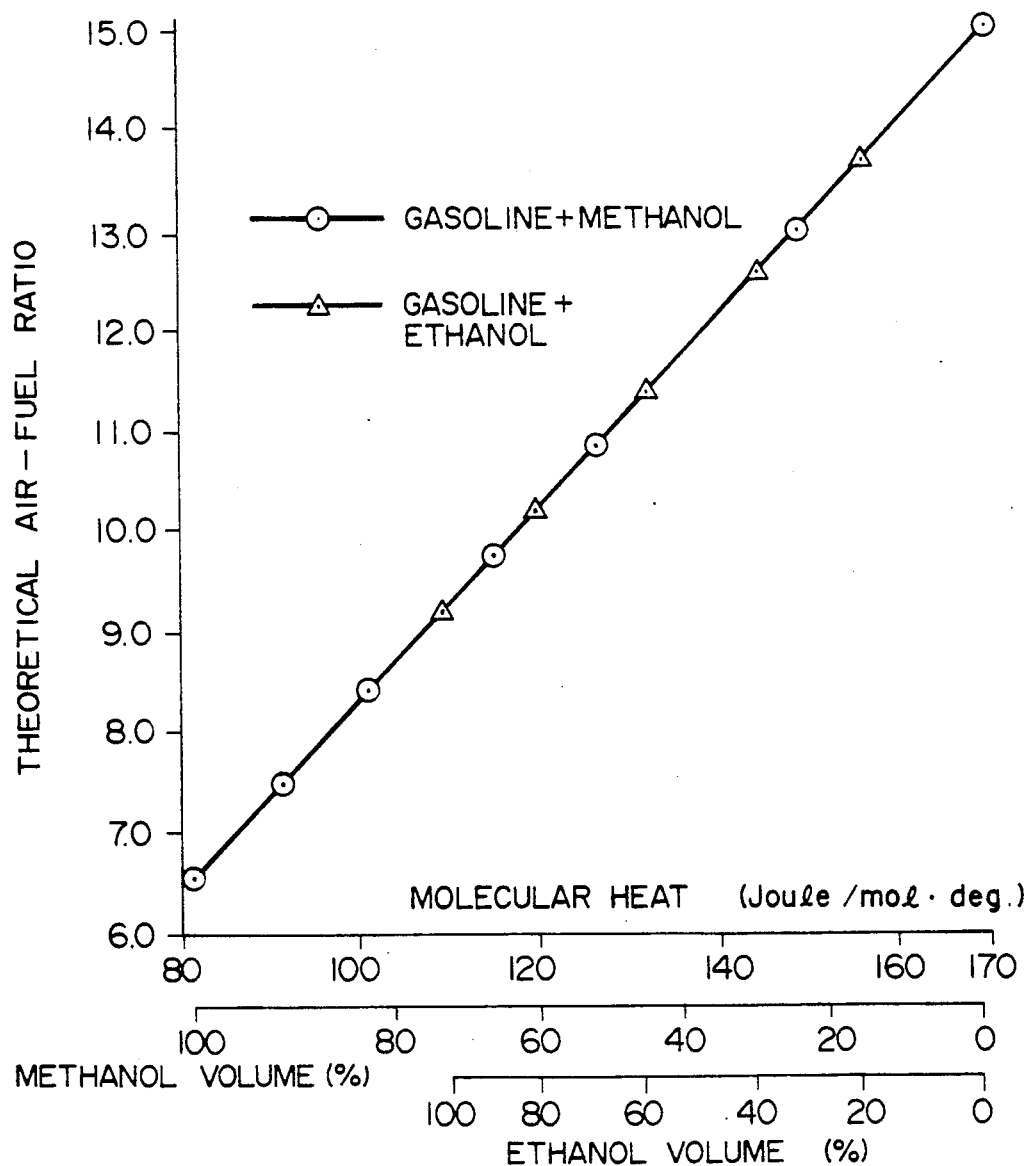
FIG. 10 is an illustration explanatory of a map.
FIGS. 11 and 12 are illustrations explanatory of the operations.

Therefore, in this embodiment, as one example, the theoretical air-fuel ratio relative to the sensor output Vf is prepared in the form of a map shown in FIG. 10 which is stored in the ROM 340, and this map is checked by the sensor output Vf to find or search the necessary theoretical air-fuel ratio. Then, this is introduced as A/F into the formulas (1) and (2), thus calculating the injection pulse duration Ti.

In another embodiment, instead of using the map, the following linear formula may be used each time so as to find A/F through calculation:

$$A/F = A + B \times Vf$$

where A and B represent constants, respectively.

In the above embodiments, the fuel nature (i.e., whether the fuel is composed solely of gasoline, or of mixed fuel of gasoline and alcohol, and the mixture ratio in the latter case) required for calculating the theoretical air-fuel ratio A/F for effecting the control is measured by the refractive index of the fuel. However, the fuel nature required for calculating the theoretical air-fuel ratio A/F corresponding to the fuel used may be found by other properties of the fuel than the refractive index thereof.

Such other embodiments of the invention will now be described.

FIG. 11 shows the relation between the molecular heat of fuel, such as gasoline and alcohol, and the theoretical air-fuel ratio. As is clear from FIG. 11, the relation between the latent heat and the theoretical air-fuel ratio is also linear.

Thus, it has been found that the theoretical air-fuel ratio can also be found by detecting the molecular heat of the fuel. Therefore, in a further embodiment of the invention, there is provided a sensor for detecting the molecular heat of the fuel, and the theoretical air-fuel ratio A/F is calculated from the result of calculation of the molecular heat, thereby controlling the fuel supply amount.

Figure 12:
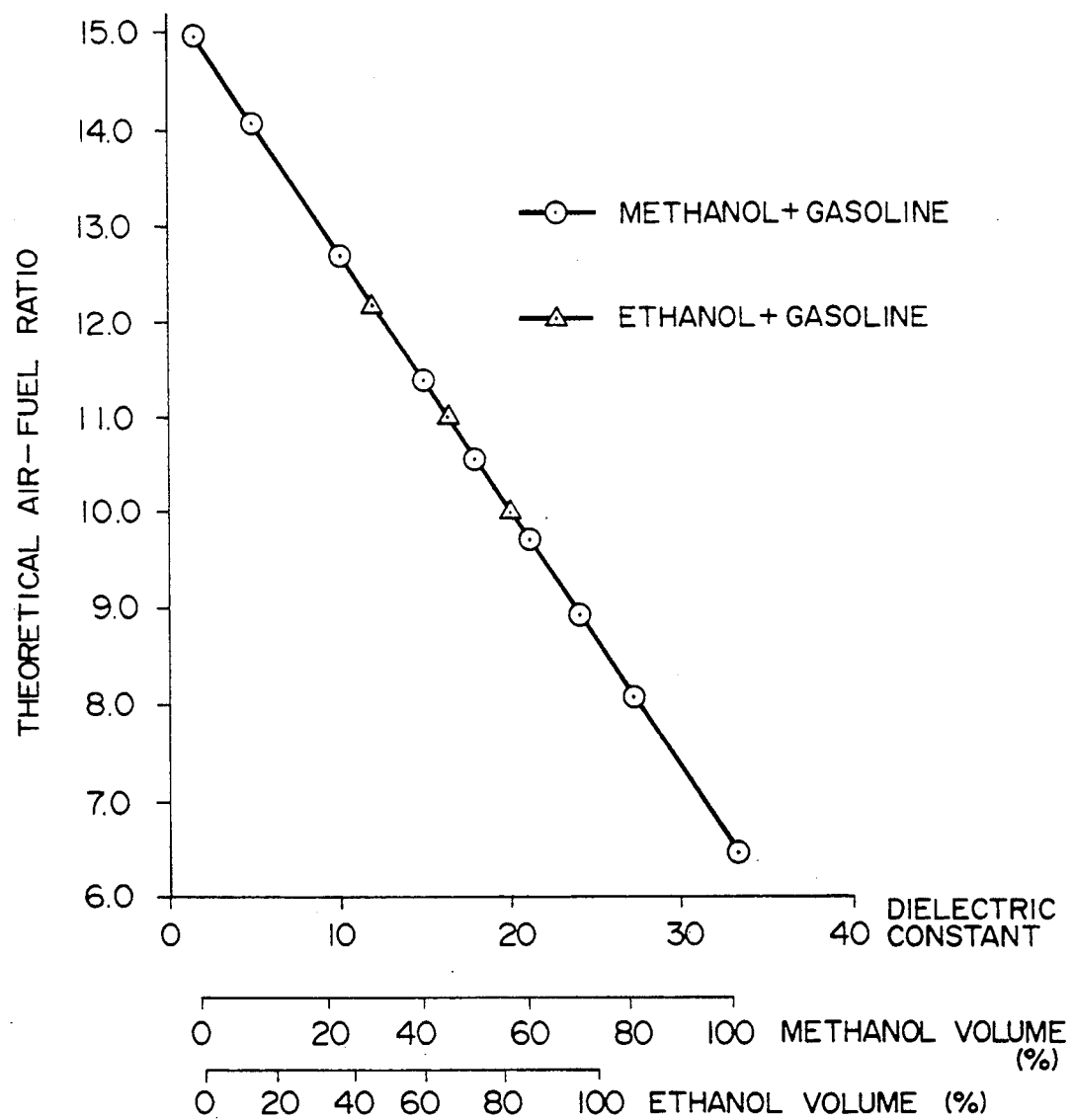

Next, FIG. 12 shows the relation between the dielectric constant of the fuel and the theoretical air-fuel ratio. As can be seen from FIG. 12, the relation between the dielectric constant and the theoretical air-fuel ratio is also linear.

Therefore, in a further embodiment of the invention, the theoretical air-fuel ratio is found by detecting the dielectric constant of the fuel, thereby controlling the fuel supply amount.

The present invention may be practiced as a learning control system. More specifically, theoretical air-fuel ratios A/F calculated at predetermined time intervals based on the condition of fuel at the instant are stored in battery back-up RAM 350, and these are used for controlling the fuel supply amount.

Figure 13:
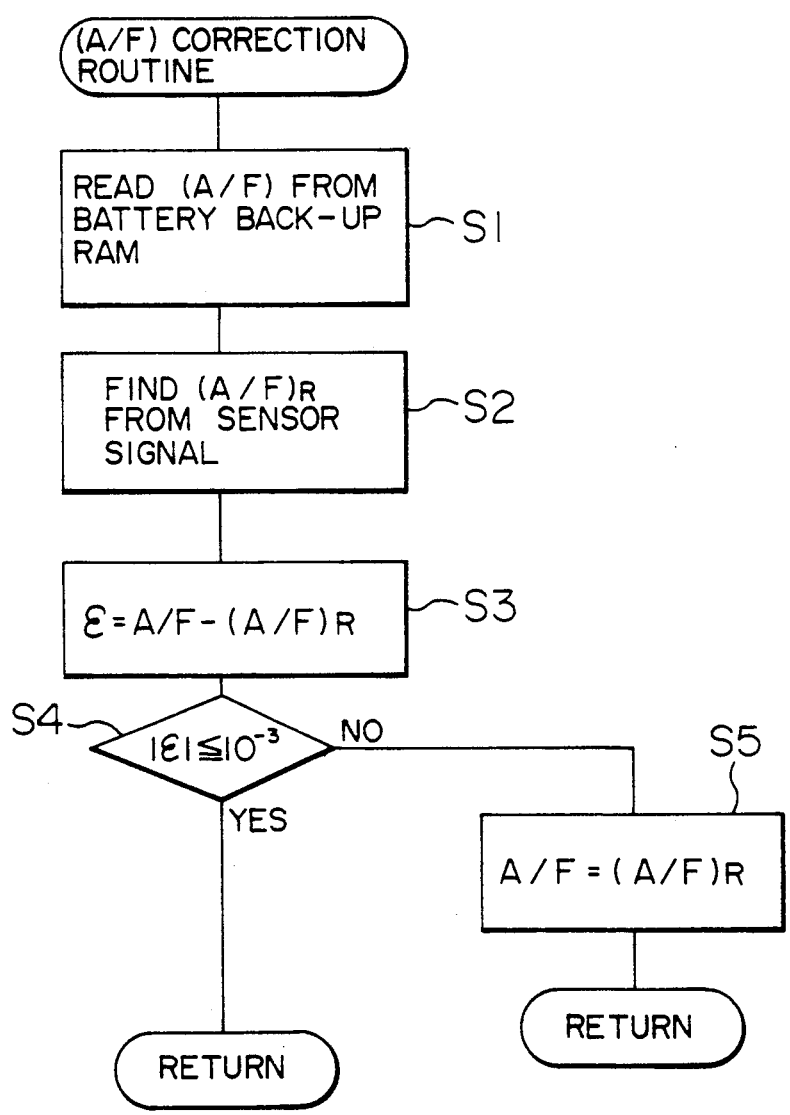
FIG. 13 is a flow chart explanatory of the operation.

FIG. 13 shows a theoretical air-fuel ratio (A/F) correction routine for such a learning control system embodying the present invention. When this routine is started, (A/F) is first read from the battery back-up RAM 350 (S1). Then, the theoretical air-fuel ratio $(A/F)_R$ is found by the sensor signal (S2).

Then, the difference between (A/F) and $(A/F)_R$ is found (S3). If this difference exceeds a predetermined value (S4), $(A/F)_R$ is replaced by a new (A/F) (S5) to correct the contents of the battery back-up RAM 350.

Figure 14:
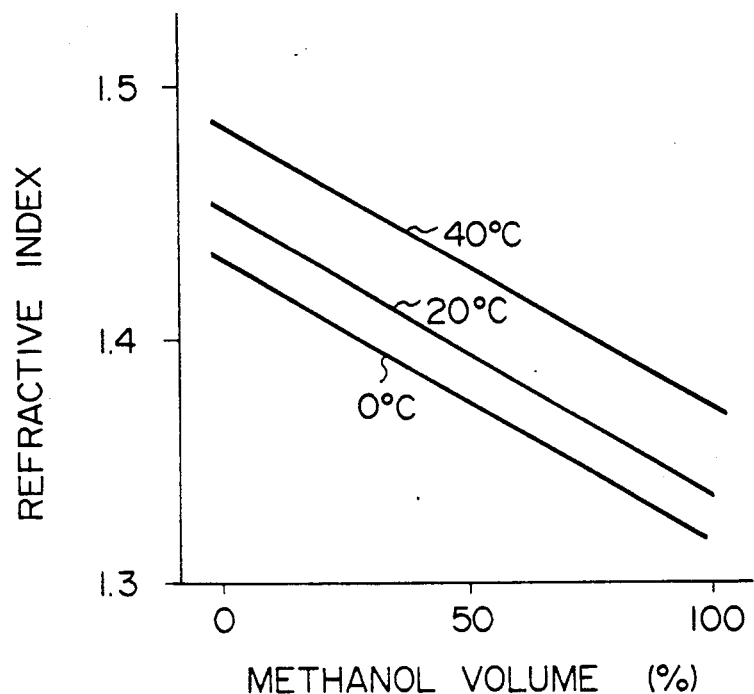
FIG. 14 is a graph showing the relation between a refractive index of fuel and a methanol volume.

FIG. 14 shows the relation between the refractive index of mixed fuel of gasoline and methanol and the volume (%) of methanol of the fuel. As is clear from FIG. 14, the refractive index of the alcohol mixed fuel varies with the temperature.

Therefore, in the above embodiments in which the theoretical air-fuel ratio is found from the refractive index of the fuel, it is necessary to effect temperature compensation. Such temperature compensation operation will now be described below.

Figure 15:
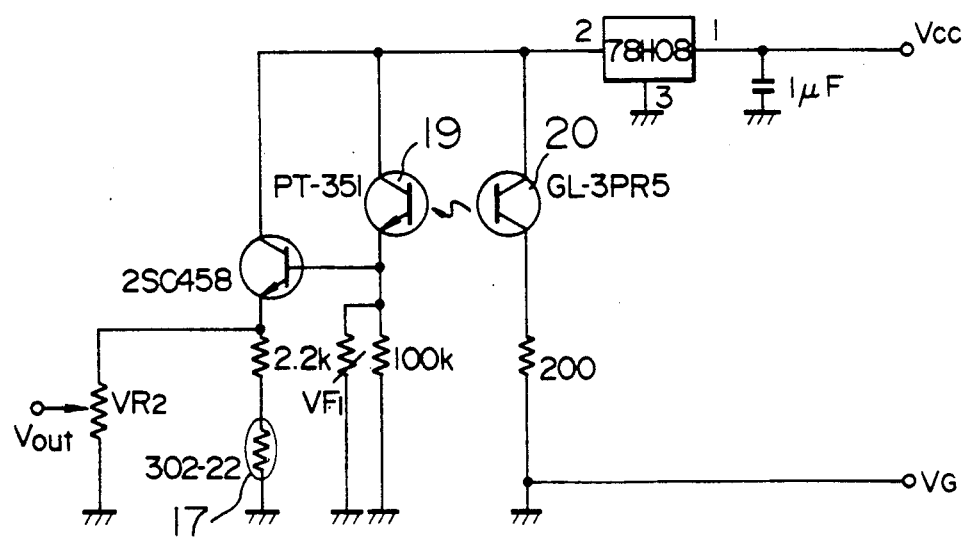
FIG. 15 is a circuit diagram of one example of fuel nature sensor.

FIG. 15 shows one example of sensor circuit 16 shown in FIG. 4. Light emitted from the light-emitting element 20 is passed through the optical fiber 21, and is received by the light-receiving element 19.

The temperature sensor 17 is, for example, an element known as thermister (tradename), and is inserted in the fuel in the fuel passage 22c as clearly shown in FIG. 4. Therefore, its resistance value varies with the temperature of the fuel, so that the signal processing characteristics from the light-receiving element 19 are changed. Therefore, by suitably selecting the resistance-temperature characteristics of the temperature sensor 17, there can be obtained the sensor output Vout subjected to a suitable temperature compensation.

Next, a method of mounting the sensor in the above embodiment will be now be described with reference to FIG. 16.

Figure 16:
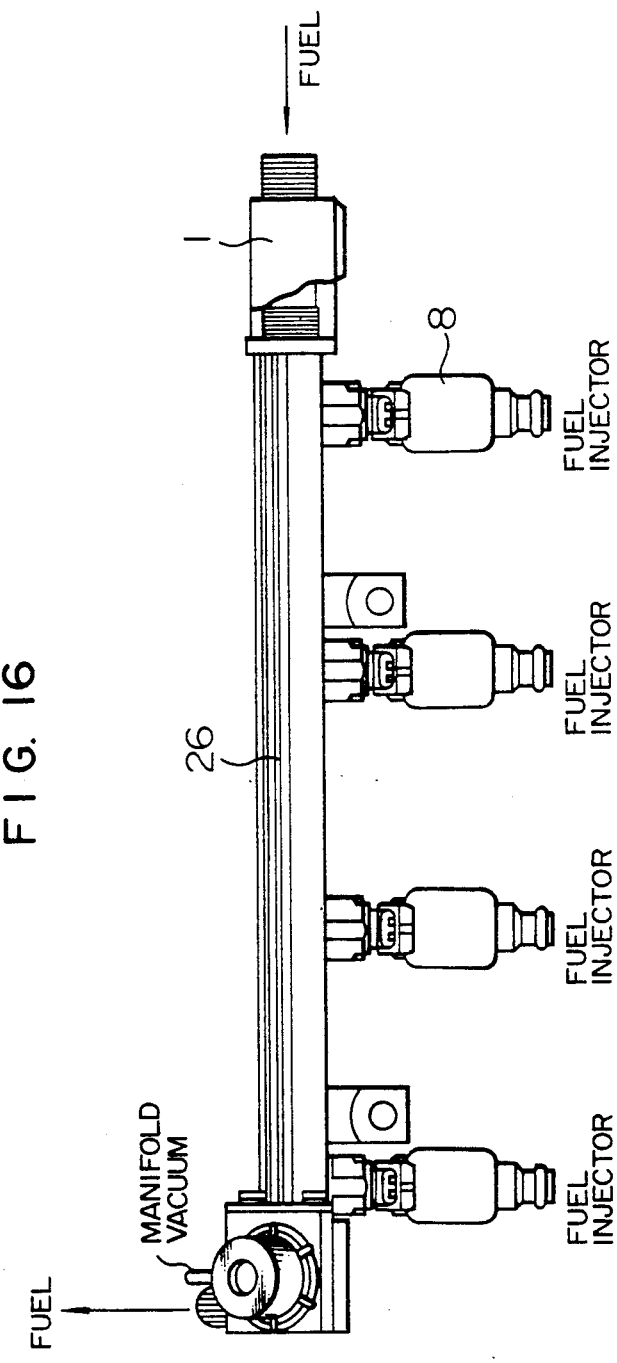
FIG. 16 is a view of another example of fuel nature sensor.

In this embodiment, as shown in FIG. 16, the fuel nature sensor 1 is integrally mounted on a fuel gallery 26 which is connected to the fuel injection valves 8 so as to supply the fuel thereto in a branched manner.

Thus, in this embodiment, the fuel nature immediately before the fuel injection valve 8 can be detected, and therefore an accurate fuel amount control can be carried out. The reason for this will be mentioned. If the fuel nature sensor 1 is provided at a position remote from the fuel injection valve, there is a risk that the nature of the fuel injected from the fuel injection valve can not be accurately detected because, for example, the fuel is separated into gasoline and methanol in a fuel hose. In this embodiment, such a risk is not encountered.

Next, another example of fuel nature sensor will now be described with reference to FIG. 17.

Figure 17:
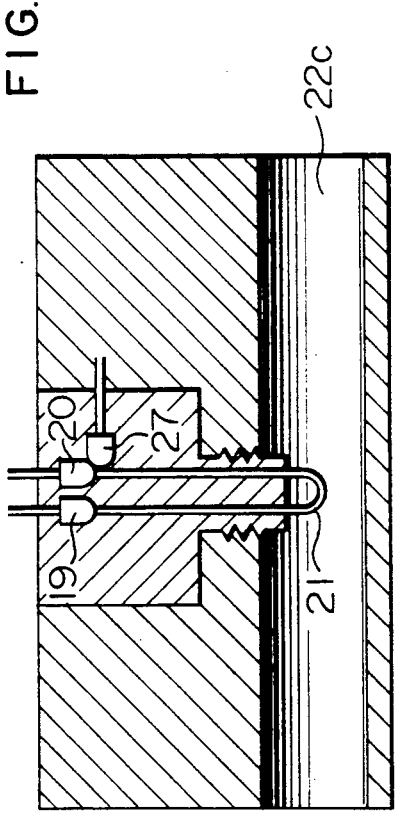
FIG. 17 is a view of a further example of fuel nature sensor.

In the embodiment of FIG. 17, in addition to a light-emitting element 20, a light-receiving element 19 and an optical fiber 21, there is provided a light-receiving element 27.

Part of light emitted from the light-emitting element 20 is detected by the light-receiving element 27 so as to find the amount of emission of the light from the light-emitting element 20, thereby correcting the signal.

Since the amount of emission of the light from the light-emitting element 20 varies with the ambient temperature, the correction is needed. In this embodiment, a change in the light emission amount can be detected by the light-receiving element 27, and therefore a precise detection of the refractive index can be made.

Figure 18:
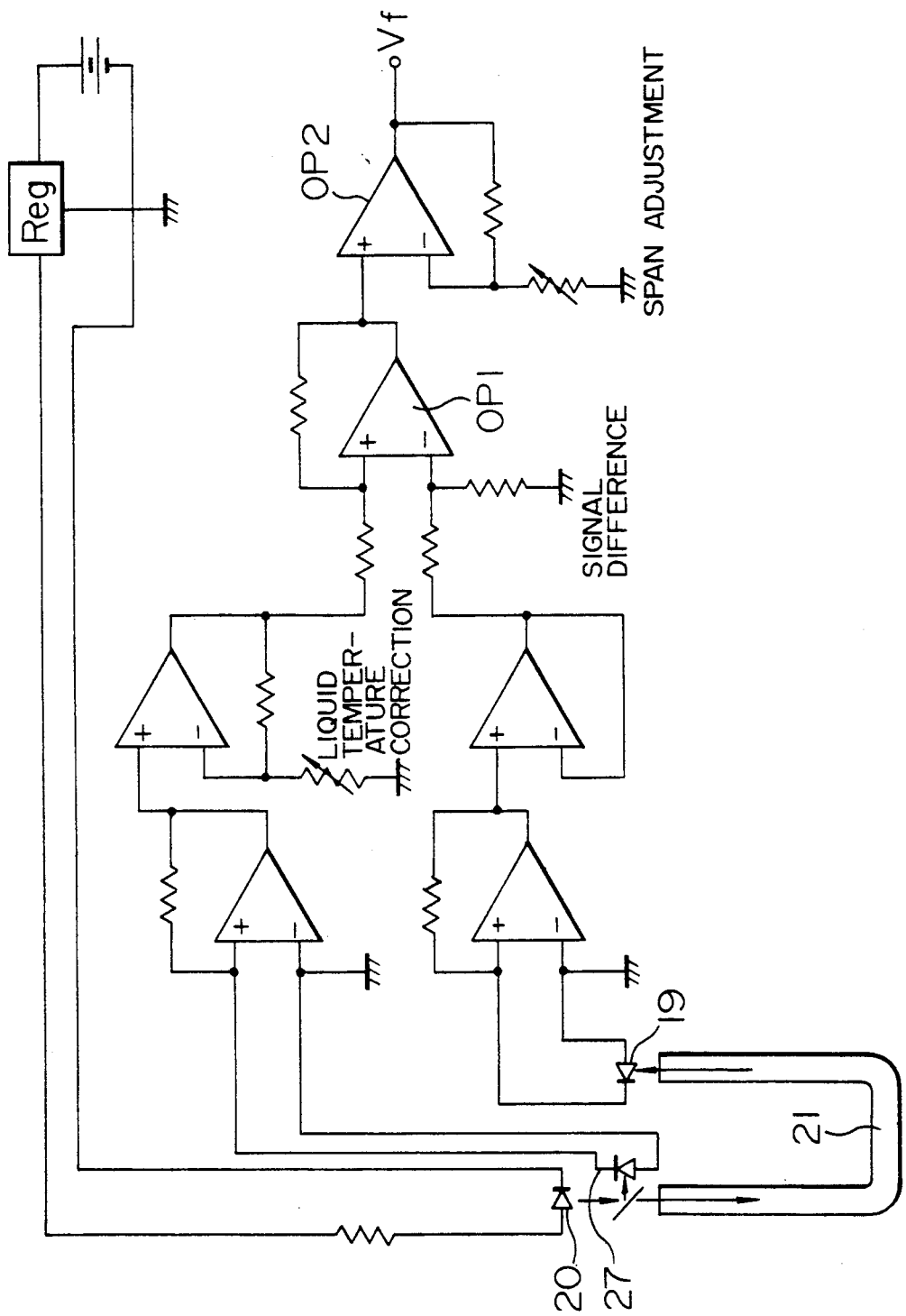
FIG. 18 is a circuit diagram of the fuel nature sensor.

FIG. 18 shows the construction of the circuit of the embodiment of FIG. 17. Part of the light emitted from the light-emitting element 20 is inputted to and detected by the light-receiving element 27. The remainder (major proportion) of the light is passed through the optical fiber 21, and is received by the light-receiving element 19.

Therefore, by finding the difference between the signals of the light-receiving elements 19 and 27 by an operational amplifier OP1, the temperature change of the light-emitting element (LED) 20 can be corrected. The signal difference is subjected to span adjustment by a subsequent operational amplifier OP2. Also, the liquid temperature correction is effected by a liquid temperature-compensating resistor shown in FIG. 18.

Next, the specific construction of the fuel nature sensor 1 will now be described.

FIG. 19 shows the distal end portion of the sensor portion on an enlarged scale. In this embodiment, a filler 27 made of a mixture of epoxy and carbon black is used to provide a seal between the optical fiber 21 and the sensor portion body 18.

In this embodiment, since the filler 27 contains carbon black, good methanol resistance as well as good gasoline resistance can be obtained.

Next, other methods of providing a seal between the optical fiber 21 and the sensor portion body 18 will now be described with reference to FIGS. 20A and 20D.

In an embodiment shown in FIG. 20A, coating glass 29 having a refractive index of not less than 1.5 is vapor-deposited on the outer periphery of the optical fiber 21, and low-melting glass 30 is fused to the outer periphery of the coating glass 29 to thereby form the seal between the optical fiber 21 and the sensor portion body 18. That portion of the sensor portion body 18 disposed in the fused glass 30 is made of metal (e.g. platinum, iridium or covar) having a linear expansion coefficient close to that of glass.

In an embodiment shown in FIG. 20B, metal 32 is vapor-deposited on the surface of the optical fiber 21, and low-melting metal 33 is provided on the outer periphery of the metal 32 and is fused to the sensor portion body 18 to thereby form a seal. As the metal to be vapor-deposited, there can be used platinum, iridium, titanium, nickel, covar, or the like.

In an embodiment shown in FIG. 20C, the seal between the sensor portion body 18 and the optical fiber 21 is formed by an organic adhesive 34. As the organic adhesive 34, there can be used a liquid crystal polymer, polyamide, or the like.

Finally, in an embodiment shown in FIG. 20D, the seal is formed by a packing 36 made of rubber having gasoline resistance and alcohol resistance. This packing 36 is usually called an O-ring.

Figure 21A:
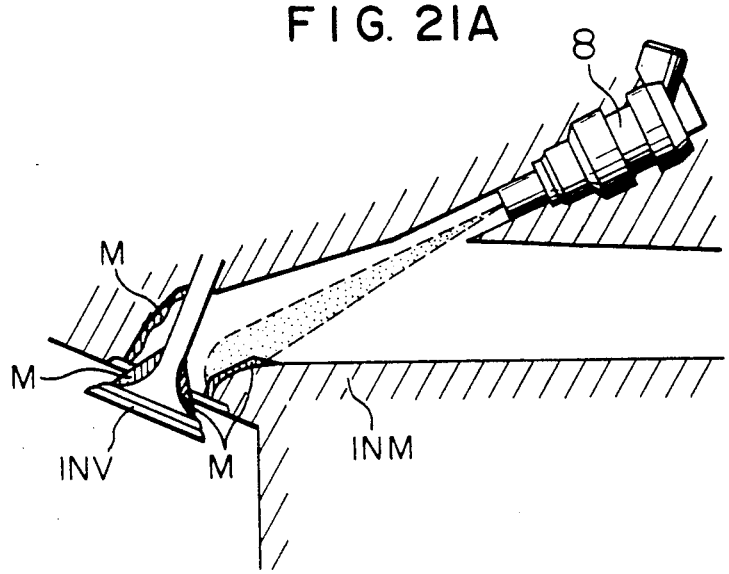
FIGS. 21A, 21B and 22 are views showing problems with the fuel injection.
Figure 21B:
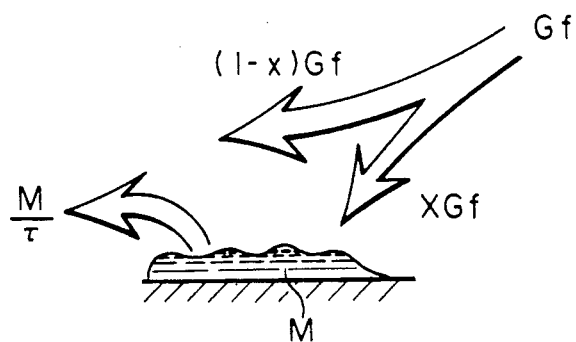

Incidentally, in this type of engine in which the fuel injection is effected in the intake pipe, part of the fuel injected from the fuel injection valve 8 is deposited on a wall surface INM of the intake pipe and an intake valve INV as shown in FIG. 21A, so that the amount of flow of the fuel into the cylinder is changed. Namely, as shown in FIG. 21B, a major proportion of the injected fuel Gf flows directly into the cylinder, but part thereof is deposited on the wall surface of the intake pipe to form a fuel liquid droplet M. Thereafter, part of the fuel liquid droplet deposited on this wall surface is evaporated, and flows into the cylinder.

Figure 22:
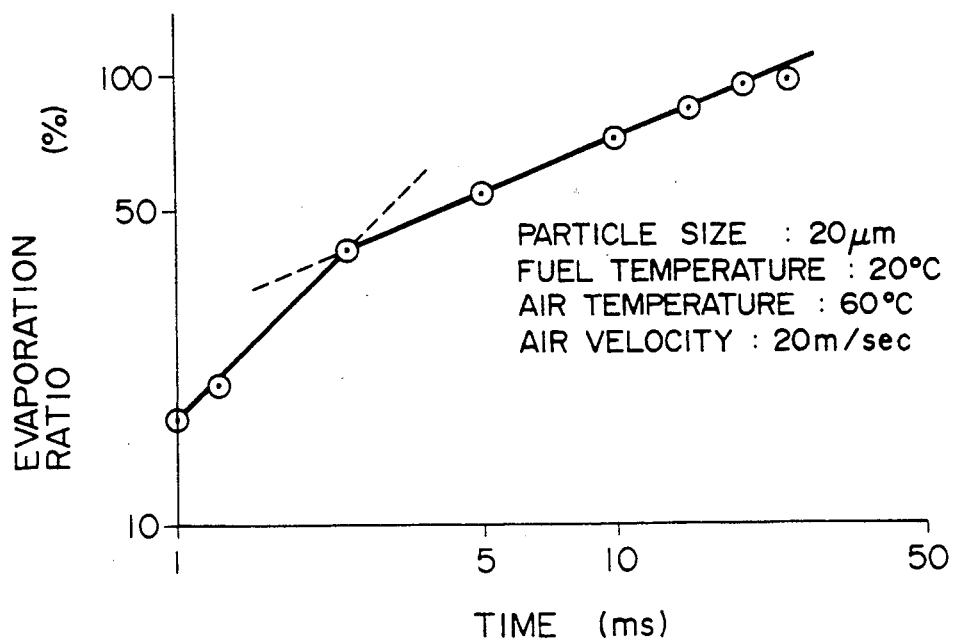

FIG. 22 shows the vaporization rate of this fuel liquid droplet which changes with time. As is clear from FIG. 22, the change occurs in a generally two-stage manner. The reason for this is that since gasoline is composed of various components, the evaporation characteristics of light components which can be easily evaporated are different from the evaporation characteristics of heavy components which can not be easily evaporated.

When gasoline contains a large proportion of heavy components, its evaporation characteristics are different form those of ordinary gasoline, and therefore in this case, it is necessary to change the fuel correction during the transient period.

Figure 23A:
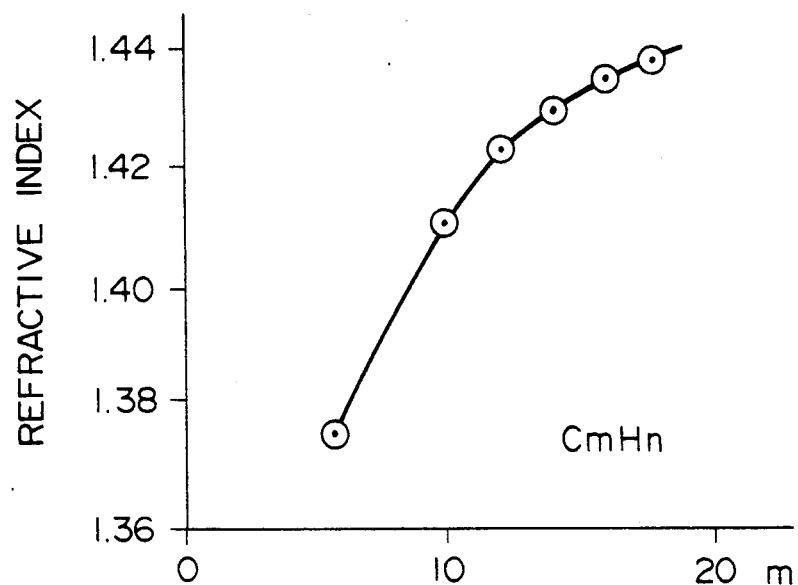
FIGS. 23A to 23B are graphs showing the relation between the number of carbons and a refractive index and the relation between the number of carbons and a boiling point, respectively.
Figure 23B:
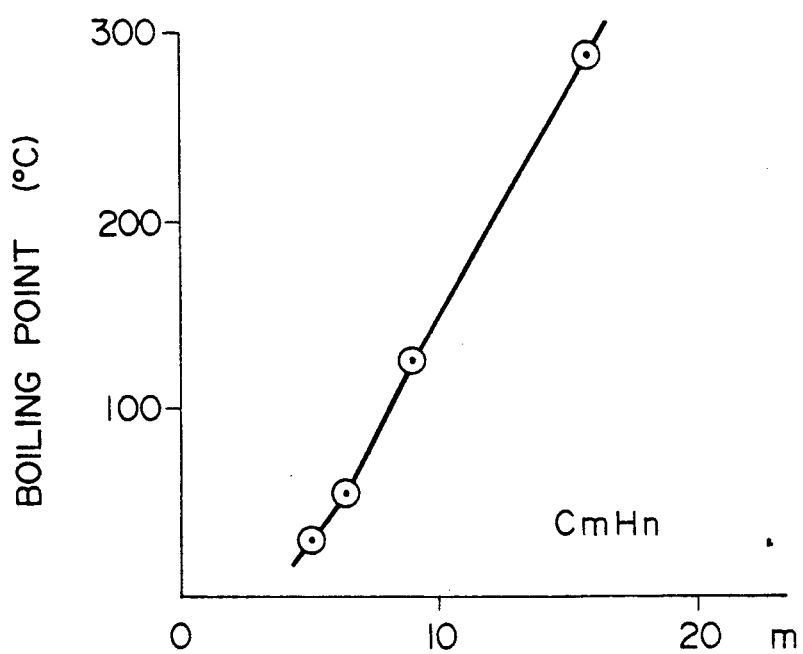

FIG. 23A shows the relation between the number m of carbon molecules in gasoline and the refractive index, and FIG. 23B shows the relation between the number m of carbon molecules in gasoline and the boiling point. As the number m of carbon molecules increases, the refractive index increases, and also the boiling point increases. It will be appreciated that the larger the carbon number is, the less the gasoline become evaporated.

Figure 25:
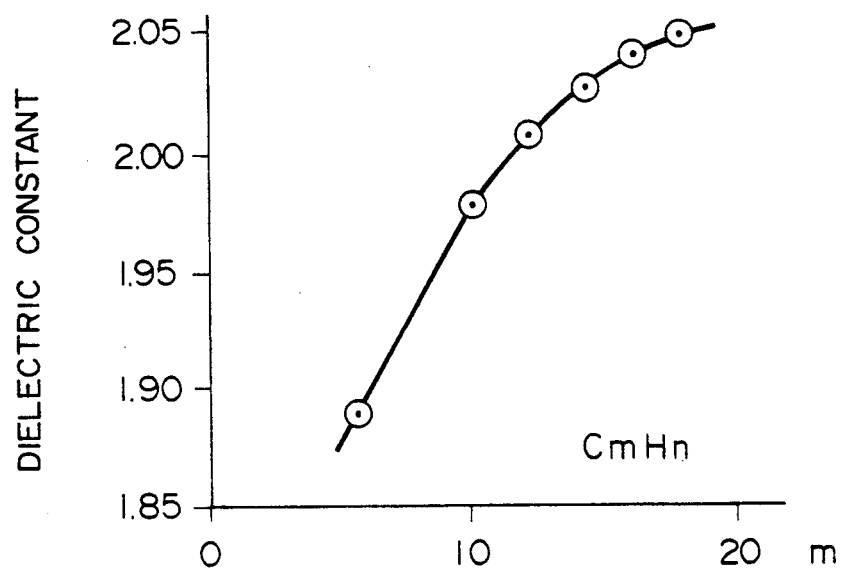
FIG. 25 is a graph showing the relation between the number of carbons in fuel and a dielectric constant.
Figure 26:
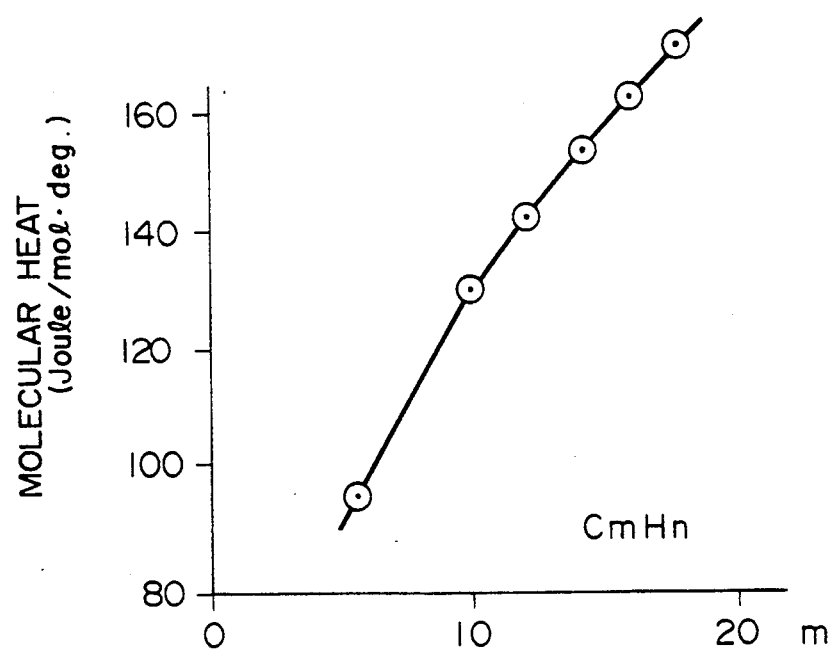
FIG. 26 is a graph showing the relation between the number of carbon in fuel and molecular heat.
Figure 27:
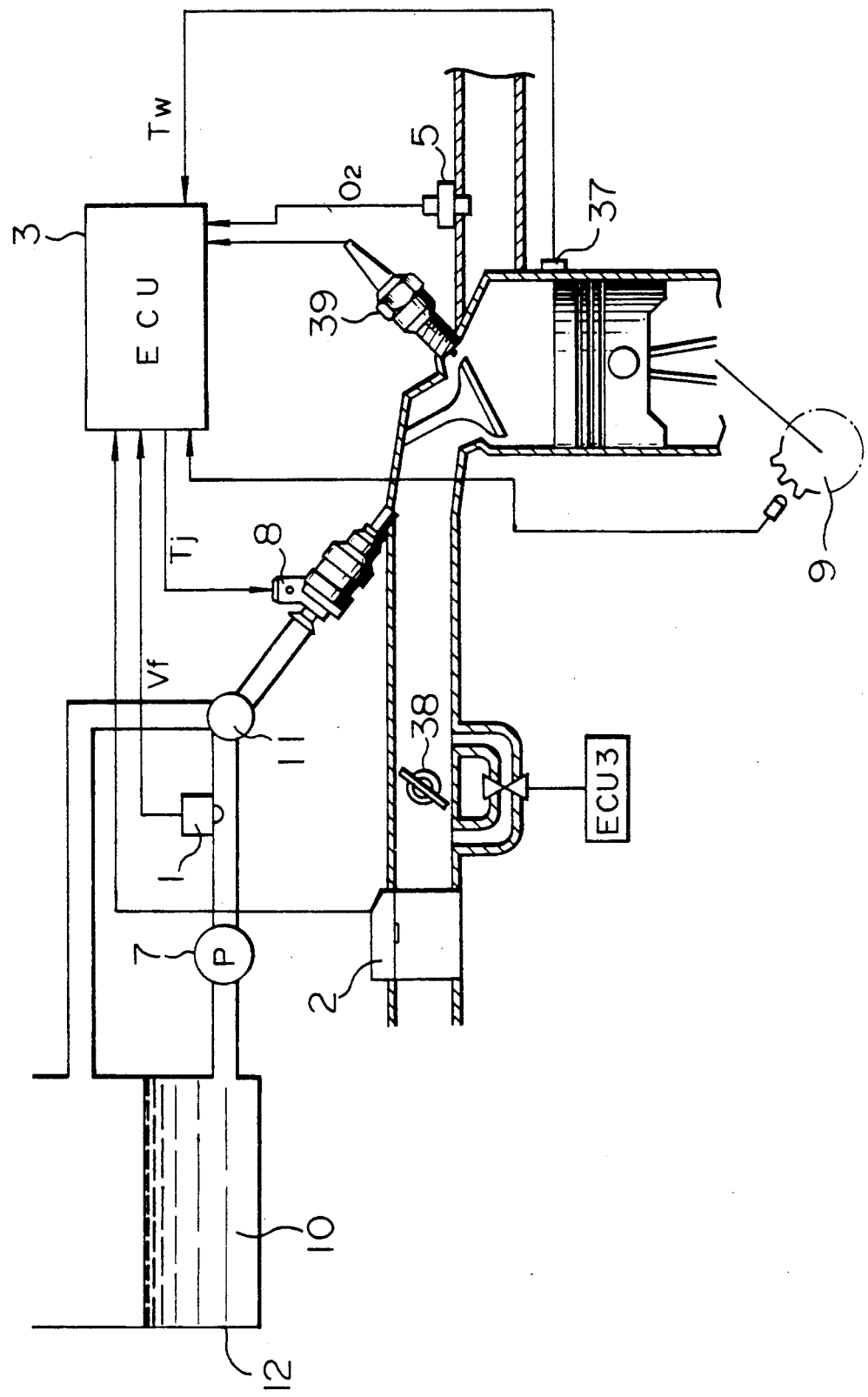
FIG. 27 is a schematic view of another embodiment of an engine control system of the invention for achieving the second object.

Therefore, by detecting the refractive index, the evaporation characteristics of the fuel can be detected. Also, the carbon number and the dielectric constant of the fuel, as well as the carbon number and the molecular heat, have a similar relation (see FIGS. 25 and 26), and therefore the evaporation characteristics of each component of the fuel can also be detected by detecting the dielectric constant or the molecular heat.

Therefore, reference is now made to an embodiment of the invention in which based on the result of detection of the above evaporation characteristics of the fuel, the delay of the fuel supply amount control due to the fuel liquid-droplet M deposited on the wall surface of the intake pipe is corrected.

Figure 24:
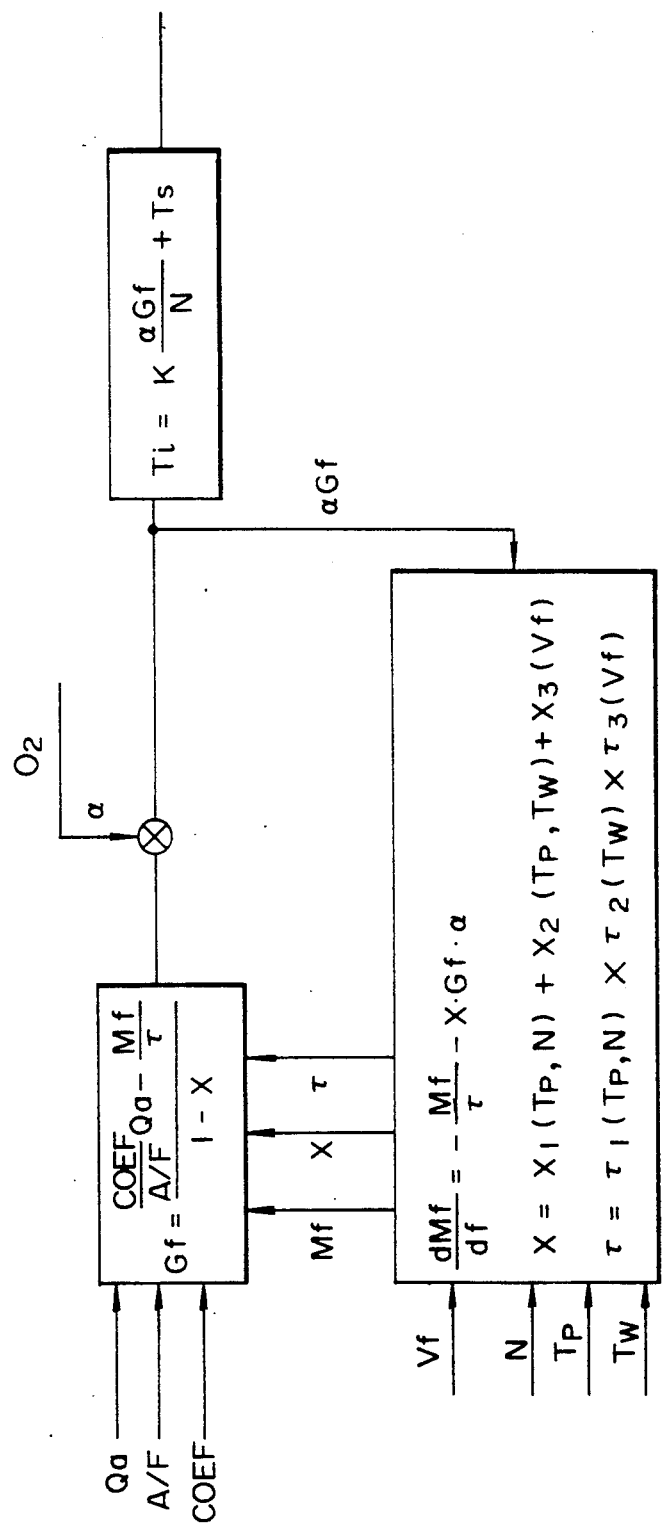
FIG. 24 is a control block diagram of an embodiment of the invention.

FIG. 24 shows a block diagram of the fuel control of this embodiment, and the amount Gf of the fuel to be supplied from the fuel injection valve 8 is expressed as follows:

$$Gf = \frac{\frac{COEF}{A/F} \cdot Qa - \frac{Mf}{\tau}}{1 - X}$$

where X represents the percentage of deposition of the fuel, $\tau$ represents an evaporation time constant, and Mf represents the amount of deposition of the fuel on the wall surface of the intake pipe. These have the following relationship:

$$\frac{dMf}{dt} = -\frac{Mf}{\tau} - XGf\alpha$$

Further, the following relations are established:

$$X = X_1(Tp, N) - X_2(Tp, Tw) + X_3(Vf)$$

$$\tau = \tau_1(Tp, N) \times \tau_2(Tp) \times \tau_3(Vf)$$

where $X_1(Tp, N)$ represents the value determined by the basic injection pulse duration Tp and the engine speed N, $X_2(Tp, Tw)$ represents the value determined by Tp and the water temperature Tw, $X_3(Vf)$ represents the value which can be found from the fuel nature sensor signal, and the deposition percentage X is determined by the water temperature, the degree of ease of the evaporation of the fuel, the amount of the fuel and the engine speed N.

On the other hand, $\tau_1(Tp, N)$ represents the value determined by Tp and the engine speed N, $\tau_2(Tw)$ represents the value determined by the water temperature Tw, and $\tau_3(Vf)$ represents the value determined by the fuel nature sensor signal.

Therefore, in this embodiment, even if the evaporation characteristics of the fuel is changed, the optimum fuel injection amount can always be supplied, even during the transient operation.

In the above embodiment, the nature of the fuel is detected, and the fuel amount is measured accurately, so that the fuel can be controlled to the optimum air-fuel ratio. Therefore, not only when gasoline is used as the fuel, but also when the fuel is changed from gasoline to mixed fuel containing methanol or ethanol, good exhaust gas characteristics can always be kept in both the steady-state and the transient state, thereby improving the fuel consumption and the operability.

Next, a preferred embodiment for achieving the second object will now be described in detail.

Mixed fuel 10 of alcohol and gasoline is contained in a fuel tank 12. The mixed fuel 10 is pressurized by a fuel pump 7, and is supplied to a fuel injection valve (injector) 8 via a fuel regulator 11. When the fuel pressure in the fuel regulator 11 increases, part of the fuel is returned to the fuel tank 12.

The mixture percentage, that is, the mixture ratio, of the mixed fuel to be supplied to the fuel injection valve 8 is detected by a fuel nature sensor 1. The temperature of a cooling water of an engine is detected by a water temperature sensor 37, and the amount of intake air is detected by an airflow meter 2, and an crank angle is detected by a crank angle sensor 9. The oxygen concentration in an exhaust gas is detected by an oxygen sensor or air-fuel ratio sensor 5. The values detected by these sensors are fed to an engine control unit (ECU) 3, and based on these detection values, the ECU calculates the fuel injection amount to control the fuel injection valve 8, and calculates the ignition timing to control an ignition plug 39, and controls the amount of bypass air of a throttle valve 38.

Figures 30, 31, 32:
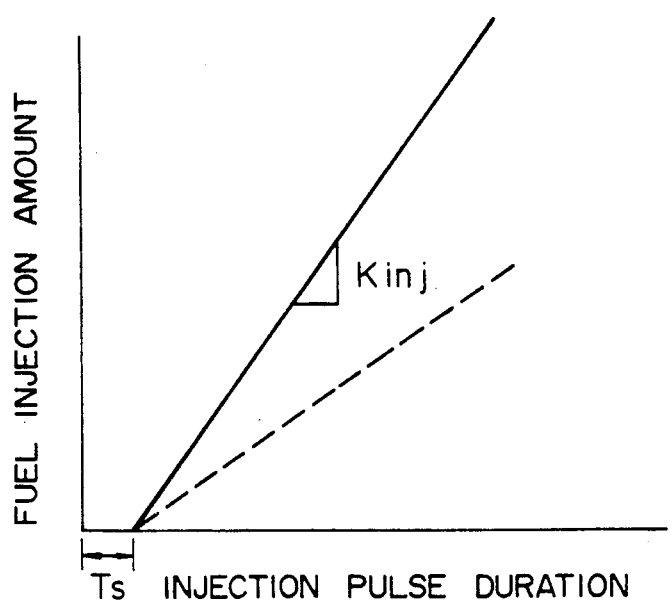
FIGS. 30 and 31 are maps showing the relation between the fuel nature sensor output and the theoretical air-fuel ratio and the relation between the sensor output and an alcohol concentration, respectively.
FIG. 32 is a graph showing the relation between an injection pulse duration Ti of an injector and the amount of injection of fuel.

The fuel nature sensor 1 may be of any suitable type, such for example as one for detecting the mixture ratio utilizing different refractive indexes of alcohol and gasoline, and one utilizing different capacitances of the two. The fuel injection amount Gf is expressed as follows:

$$Gf = C \cdot Ga/(A/F) \quad \ldots \quad (6)$$

where Ga represents the amount of the intake air detected by the airflow meter 2, (A/F) represents the theoretical air-fuel ratio found from the fuel nature sensor output as shown in FIG. 30 (later described), and C represents a coefficient of warming correction or acceleration correction.

On the other hand, the fuel injection pulse duration Ti is expressed as follows:

$$Ti = K \cdot \alpha \cdot Gf/N + Ts \quad \ldots \quad (4)$$

where $\alpha$ represents a coefficient of feedback by the oxygen sensor, N represents the engine speed determined by the crank angle sensor, K represents an injector coefficient, and Ts represents a reactive injection pulse duration.

The theoretical air-fuel ratio (A/F)s during the $O_2$ feedback control is expressed as follows:

$$(A/F)s = C \cdot Ga/Gf \quad \ldots \quad (5)$$

By introducing the formula (4) into the formula (5), the following is obtained:

$$(A/F)s = \alpha \cdot K \cdot C \cdot Ga/N(Ti - Ts) \quad \ldots \quad (6)$$

The oxygen sensor can detect the theoretical air-fuel ratio, and therefore if the value of $\alpha$ at that time is used, the theoretical air-fuel ratio (A/F)s can be detected from the injection pulse duration Ti and the engine speed N.

Figure 28:
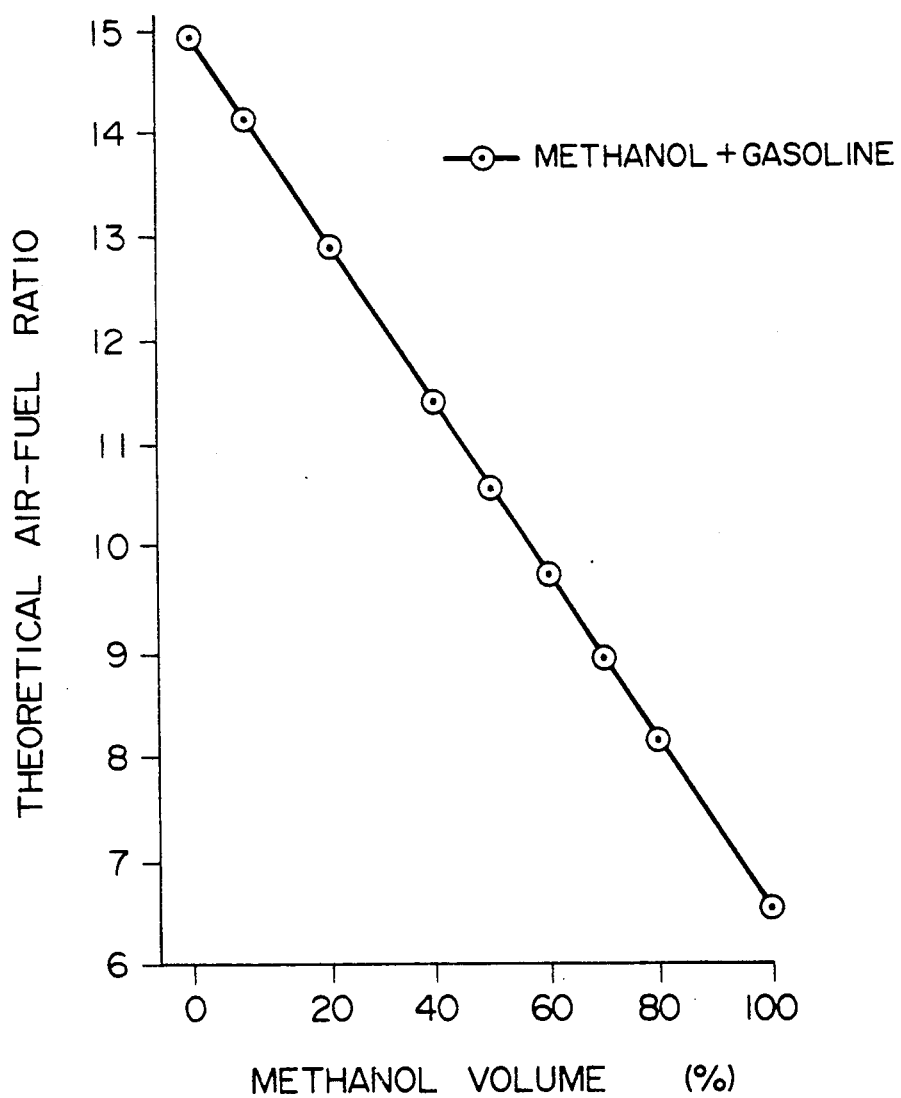
FIG. 28 is a graph showing the relation between a theoretical air-fuel ratio and a methanol concentration of mixed fuel.

FIG. 28 is a graph showing the relation between the theoretical air-fuel ratio and the concentration of methanol in the mixed fuel. According to this graph, if the theoretical air-fuel ratio is found, the methanol concentration can be found. This methanol concentration, that is, the mixture percentage (determined from the detection value of the oxygen sensor) is represented by $Mo_2$. On the other hand, the mixture percentage detected by the fuel nature sensor 1 is represented by Ms. The two mixture percentages are usually equal to each other (Ms = $Mo_2$).

Figure 29:
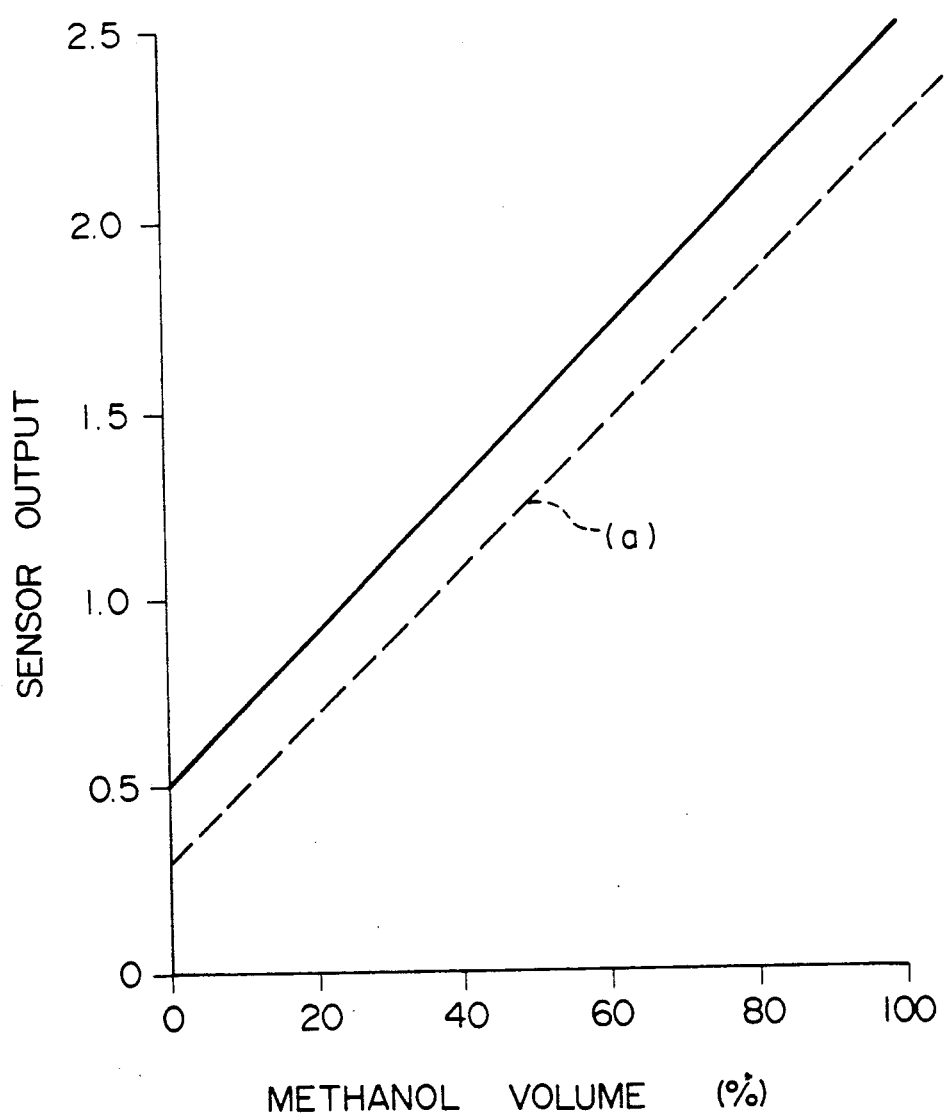
FIG. 29 is a graph showing the relation between a methanol concentration value detected by a fuel nature sensor and a sensor output.

FIG. 29 is a graph showing the relation between the value of the methanol concentration detected by the fuel nature sensor and the sensor output. According to this graph, as the methanol concentration increases, the sensor output increases. On the other hand, in fuel nature sensors of the optical type, the capacitance type, or other type, its surface adapted to be contacted with the fuel is smeared by the fuel, so that its sensor output characteristics may be changed. When the characteristics indicated by a solid line in FIG. 29 are deteriorated as indicated by a characteristics line a, the same sensor output, which detects 50% before the change of the sensor output characteristics, detects 60% after this change. In this case, the relation (Ms > $Mo_2$) is established. Also, the value of $\alpha$ is close to "1". Namely, when the above relation occurs, it is judged that the fuel nature sensor has been deteriorated. Therefore, it is necessary to correct the output characteristics of the fuel nature sensor.

FIG. 30 shows a diagram showing the relation between the output voltage of the fuel nature sensor and the theoretical air-fuel ratio. FIG. 31 is a diagram showing the relation between the output voltage of the fuel nature sensor and the methanol concentration. The ECU 3 has EP-ROM and battery back-up RAM which respectively store the data of FIG. 30 and the data of FIG. 31 in the form of a map. In this embodiment, the contents of the map (FIG. 31) of the battery back-up RAM are corrected by the mixture ratio $Mo_2$ found from the oxygen sensor.

FIG. 32 is a graph showing the relation between the injection pulse duration Ti of the injector 8 and the full injection amount. As the pulse duration Ti increases, the fuel injection amount increases. However, when a deposit is formed on a fuel orifice of the injector 8, the fuel injection amount is decreased, so that the inclination (Kinj) of the characteristics line representing the relation between the pulse duration Ti and the fuel injection amount is decreased as indicated by a dotted line in FIG. 32. Therefore, when the fuel injection amount is to be calculated from the mixture percentage $Mo_2$ detected by the $O_2$ feedback, using the injector having the above deposit (that is, subjected to aging deterioration), the calculated fuel injection amount is the same as that obtained with the injector having no such deposit, so that the calculated pulse duration Ti is larger. Namely, according to the formula (6), Ti is calculated to a larger value, and therefore the theoretical air-fuel ratio (A/F)s is decided to be smaller. In this case, the following relation is established:

$$Ms < Mo_2$$

In this case, $\alpha$ is larger than "1". When this relation is established, it is judged that the fuel injection valve 8 is subjected to deterioration, and the detection value Ms of the fuel nature sensor is used as the value of the mixture ratio. Namely, the theoretical air-fuel ratio is found based on the detection value Ms of the fuel nature sensor, and the constant K is corrected so that the theoretical air-fuel ratio calculated by the formula (6) can coincide with it. The constant K is stored in the EP-ROM and the battery backup RAM, and when it is judged that the fuel injection valve is deteriorated, the amount of correction of the constant K is calculated, and this correction amount is stored in the above RAM.

In the manner described above, the deteriorations of the fuel injection valve and the fuel sensor can be detected.

Figure 33:
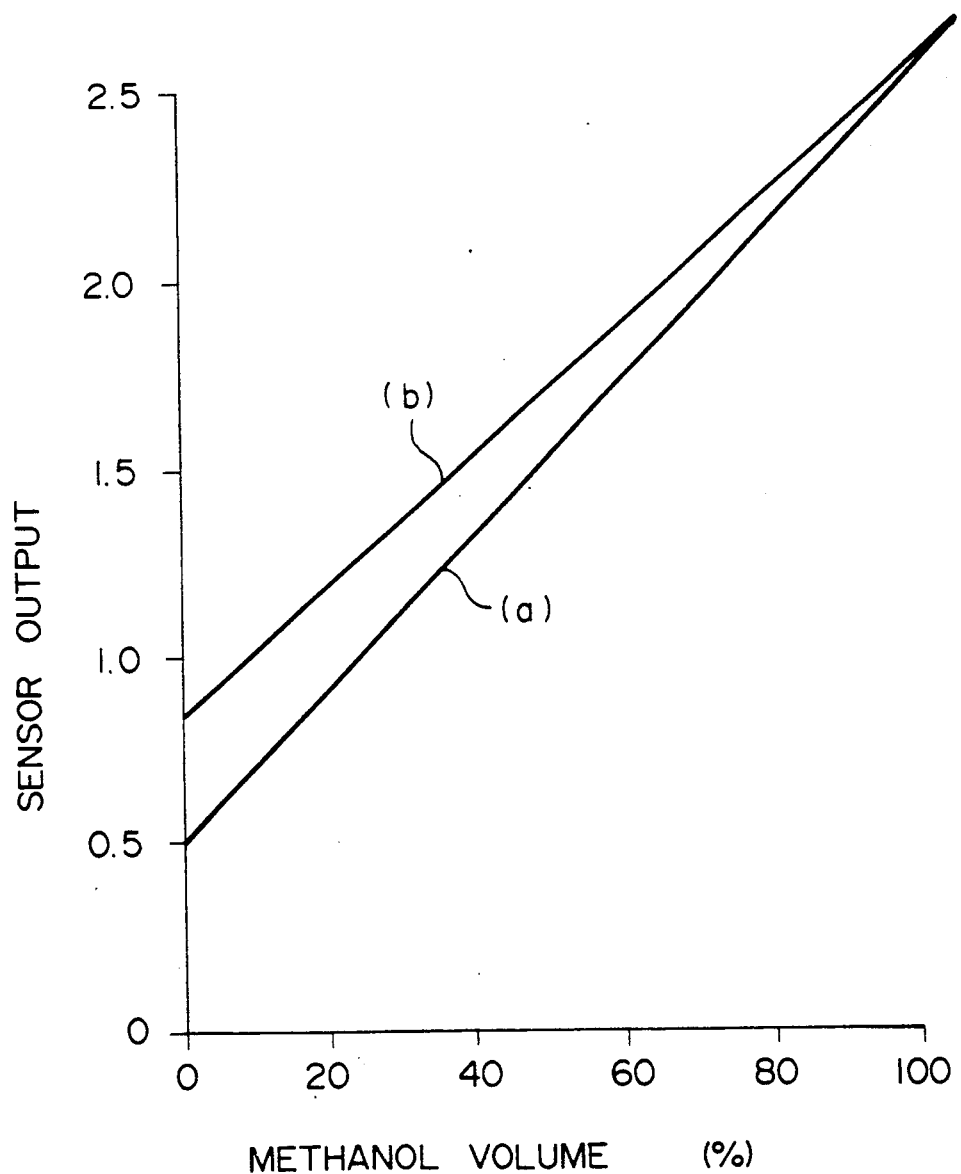
FIG. 33 is a graph showing the relation between the methanol concentration and the fuel nature sensor output.

FIG. 33 is a graph showing the relation between the methanol concentration and the output of the fuel nature sensor. The sensor output a obtained with the mixed fuel using regular gasoline is different from the sensor output b obtained with the mixed fuel using high-octane gasoline, because the compositions of the two are different from each other. According to this graph, in the high-octane gasoline-containing fuel, even when the fuel nature sensor output is the same, it is judged that the methanol concentration is smaller, and therefore the methanol concentration is corrected by the detection value of the oxygen sensor. Namely, the relation (Ms < $Mo_2$) is established. In this case, if the value of $\alpha$ is close to "1", it is judged that the high-octane gasoline is used, the fuel nature sensor output and the ignition timing are switched to the high-octane mode.

Figure 34A:
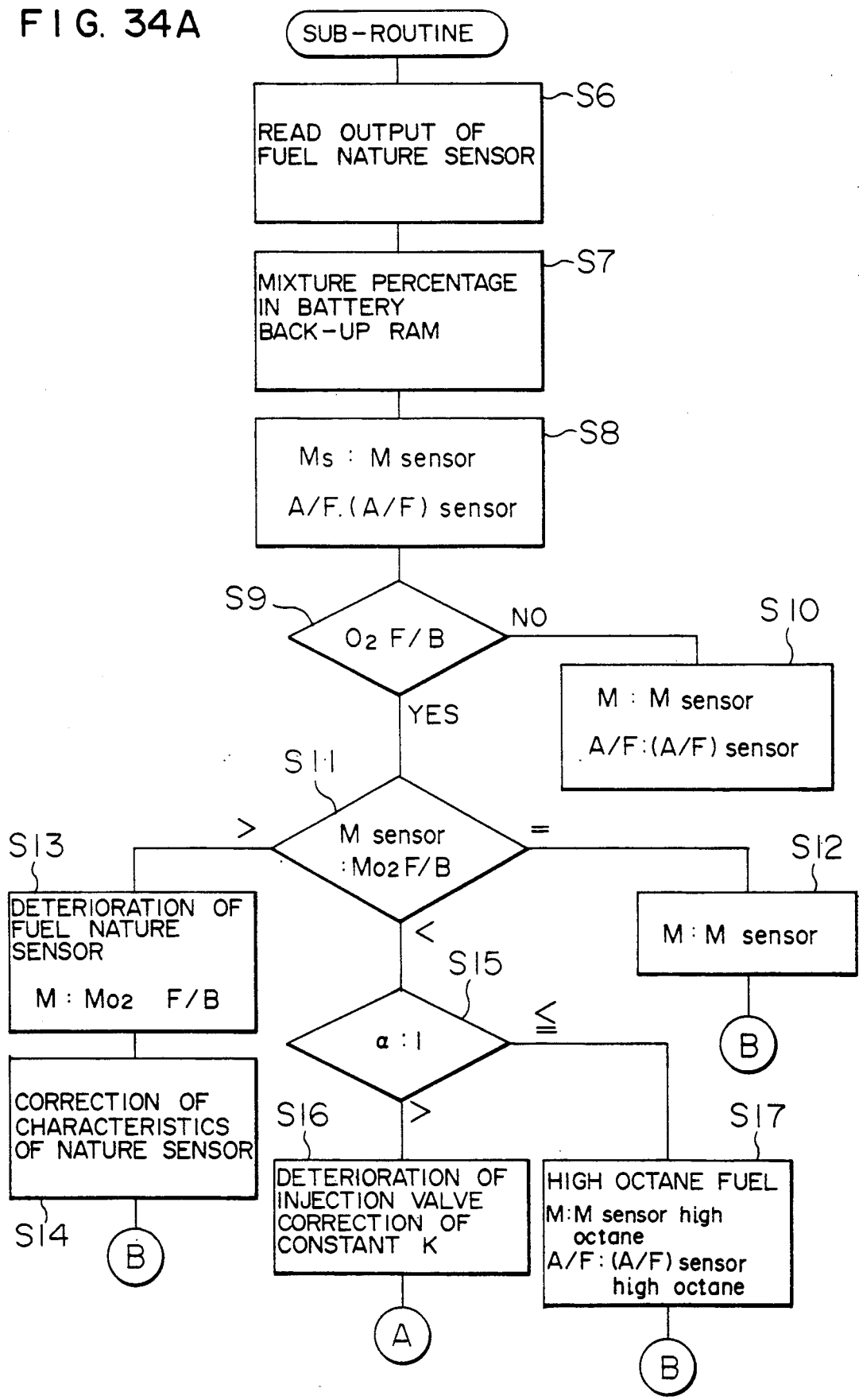
FIGS. 34A and 34B show collectively a flow chart for a correction procedure according to an embodiment of the invention.
Figure 34B:
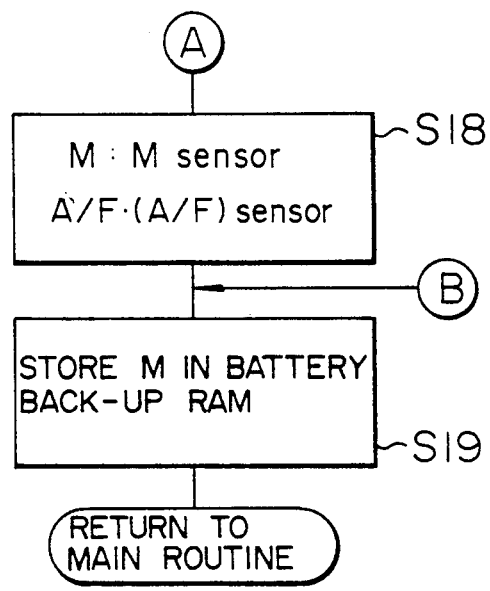

Next, the procedure of the above correction will now be described with reference to a flow chart of FIGS. 34A and 34B.

First, in Step S6, the output of the fuel nature sensor is inputted or read. Then, in Step S7, the maps of FIGS. 30 and 31 are checked based on this sensor output value. In Step S8, the theoretical air-fuel ratio (A/F) and the mixture percentage Ms are found. Also, from the above formula (6), the theoretical air-fuel ratio (A/F)s is found. In this case, if the fuel nature sensor output is out of the ordinary range (from the output voltage of 100% gasoline to the output voltage of 100% alcohol), the mixture percentage stored in the battery back-up RAM is used. In the other cases, the actual detection value of the fuel nature sensor is used.

If it is judged in Step S9 that the operation condition is out of the $O_2$ feedback control region, or in the engine warming region in which the $O_2$ feedback control is not effected because of the low temperature, the fuel injection amount is calculated from the detection value of the fuel nature sensor output so as to effect the control (Step S10).

If the operating condition is in the $O_2$ feedback region, the fuel injection duration Ti is calculated based on the detection value of the oxygen sensor (Step S11), and the mixture percentage $Mo_2$ is found based on this injection pulse duration Ti, and subsequently similar judgment is made, and it is judged whether or not the fuel nature sensor and the fuel injection valve are deteriorated, so as to find the correction amount. This correction amount thus found is stored in the battery back-up RAM.

First, in Step S11, it is judged whether the value of Ms found from the detection value of the fuel nature sensor is smaller than, equal to or larger than the value of the mixture percentage $Mo_2$ found from the detection value of the oxygen sensor. If $(Ms=Mo_2)$ is obtained, the value of Ms is used as the mixture percentage (Step S12). If $(Ms>Mo_2)$ is obtained, this means that the fuel nature sensor is deteriorated as described above, and therefore the fuel nature sensor output is corrected by the mixture percenta9e found from the detection value of the oxygen sensor (Step S13), and this correction is stored in the battery back-up RAM (Steps S14 and S19). If $(Ms<Mo_2)$ is obtained, it is judged whether the value of is smaller than, equal to or larger than "1" (Step S15). If $(\alpha>1)$ is obtained, it is judged that the fuel injection valve is deteriorated (Step S16), and the constant K is corrected, and this correction is stored in the battery back-up RAM (Steps S18 and S19). If $(\alpha\leq1)$ is obtained, it is judged that the gasoline is of the high octane type (Step S17), a high-octane mode map (not shown) for the fuel nature sensor characteristics is used, and also high-octane mode maps (not shown) for the air-fuel ratio, the ignition timing, etc., are used. After the above corrections are made, the program is returned to the main routine, and the fuel injection amount is calculated. Namely, if the fuel nature sensor is not deteriorated, the fuel injection pulse duration is calculated using the detection value of the fuel nature sensor. If the fuel nature sensor is deteriorated, the fuel injection pulse duration is calculated using the corrected output of the fuel nature sensor. If the fuel injection valve is deteriorated, the fuel injection pulse duration is calculated using the corrected constant K.

In this embodiment, even if the fuel nature sensor and the fuel injection valve are subjected to aging deterioration, the mixture percentage can be found accurately. Therefore, even when the mixed fuel is used, the various controls, such as the air-fuel ratio control, the ignition timing control, the intake air amount control, the fuel supply amount control and the supercharging pressure control, can be effected precisely.

Next, preferred embodiments for achieving the third object will now be described with reference to the drawings. First, a preferred embodiment will now be described with reference to FIGS. 35 to 39.

Figure 35:
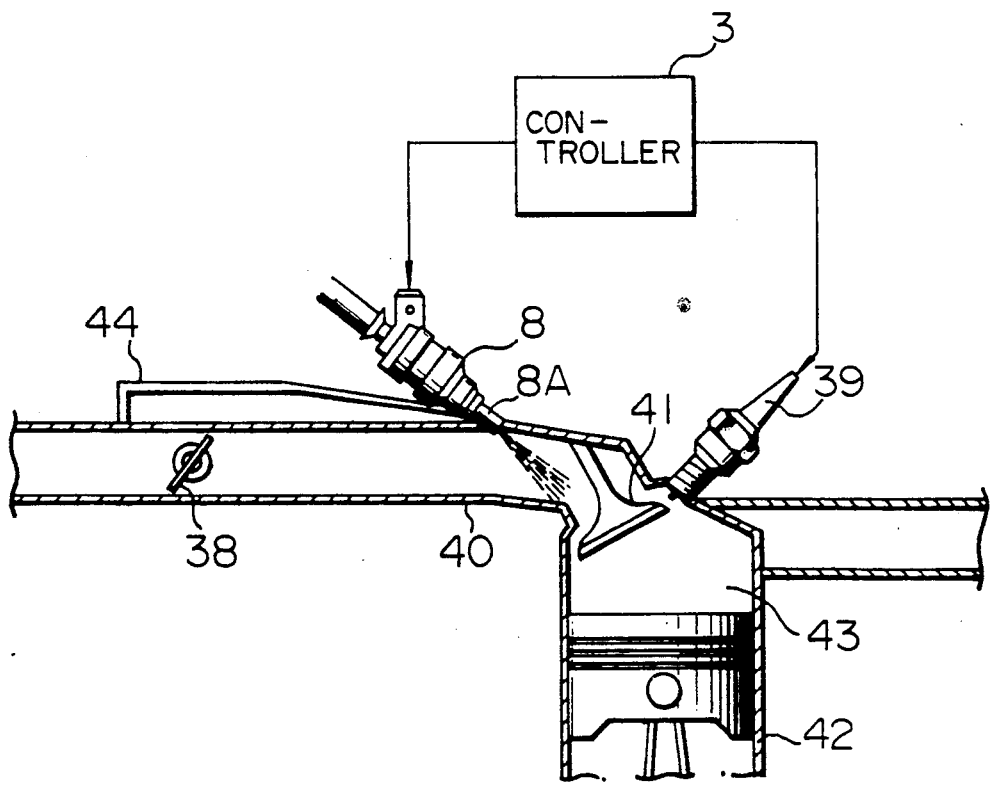
FIG. 35 is a schematic view of a fuel injection device of the present invention for achieving the third object.

In FIG. 35, a fuel injection valve 8 is fixedly mounted on an intake pipe 40, and atomized fuel injected from the fuel injection valve 8 passes past an intake valve 41, and flows into a combustion chamber 43 of an internal combustion engine 42. Thereafter, a spark is produced by an ignition plug 39, so that the combustion begins. An air flow (air stream) bypassing a throttle valve 38 is fed to a fuel injecting portion 8A of the fuel injection valve 8 via a passage 44. The injection valve 8 and the ignition plug 39 are controlled by a controller 3. In this embodiment, the direction of injection of the atomized fuel from the injection valve 8 is controlled by the air stream, passing through the air passage 44, in accordance with the operating condition of the engine 42.

Figure 36:
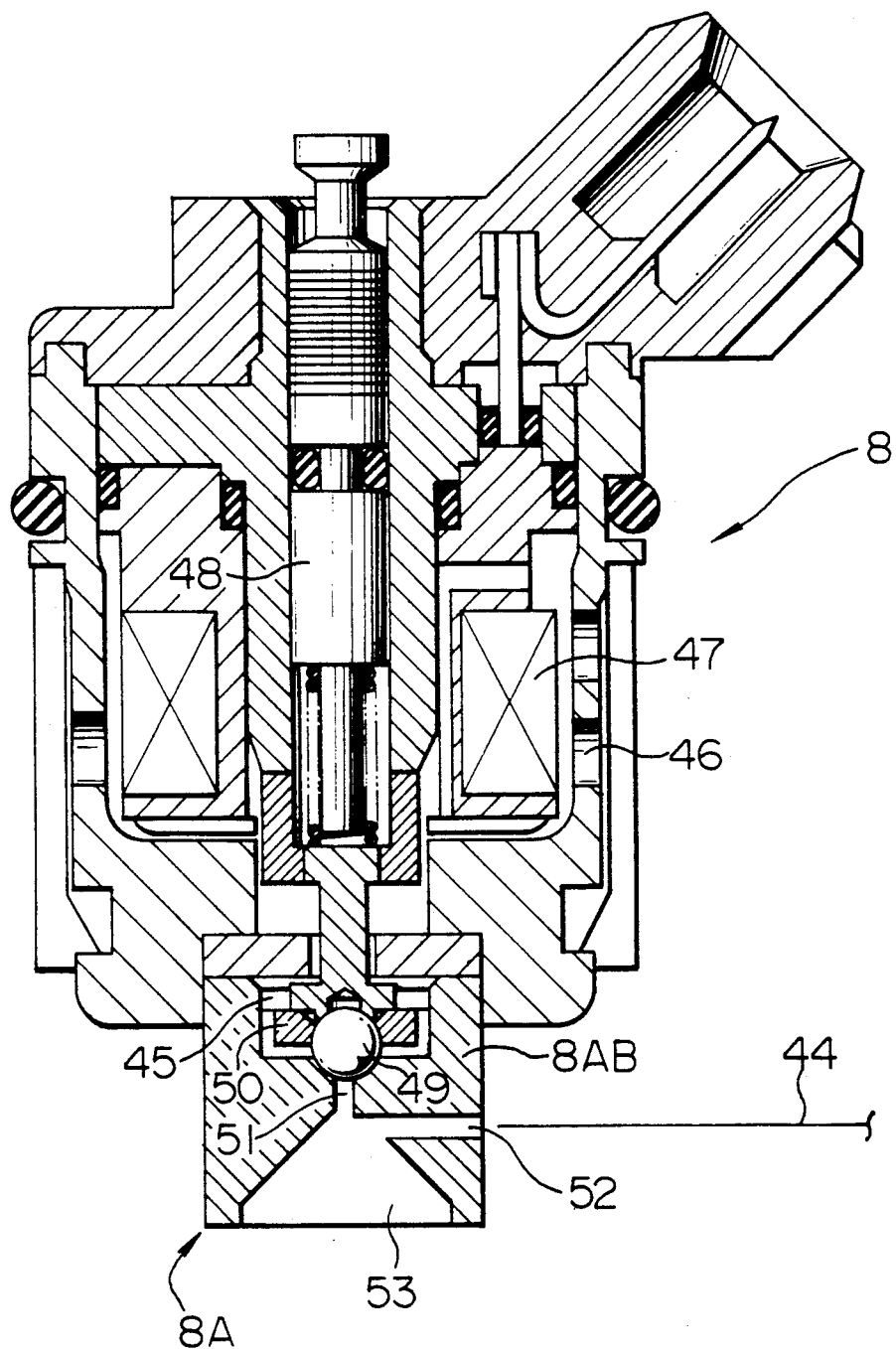
FIG. 36 is a cross-sectional view of the fuel injection device.

FIG. 36 shows the construction of the fuel injection valve 8. The fuel enters the injection valve from an fuel inlet port 44, and flows to an outlet port 46 via a fuel reservoir portion 45, the fuel being always kept pressurized under a constant pressure. When a ball valve 49 is lifted by the action of an electromagnetic coil 47 and a plunger 48, the fuel is injected via a swirller 50 and a metering orifice 51.

The above is a conventional construction of a fuel injection valve. In the fuel injection valve 8 of this embodiment, there is provided a mechanism for feeding the air stream, passed through the passage 44, to the fuel injecting portion 8A of the injection valve 8. More specifically, an air passage 52 is formed in a body 8AB of the fuel injecting portion 8A, and a flaring port portion 53 is formed in the body 8AB at a position downstream of the metering orifice 51. The diameter of the port portion 53 increases progressively downward. The air passage 52 communicates with the port portion 53. The air flow passed through the passage 44 is introduced into the air passage 52, and impinges on the fuel, injected from the metering orifice 51, at the port portion 53, so that the direction of injection of the fuel is changed. When the air flow is not introduced into the passage 52, the fuel is injected without being deflected.

Figure 37A:
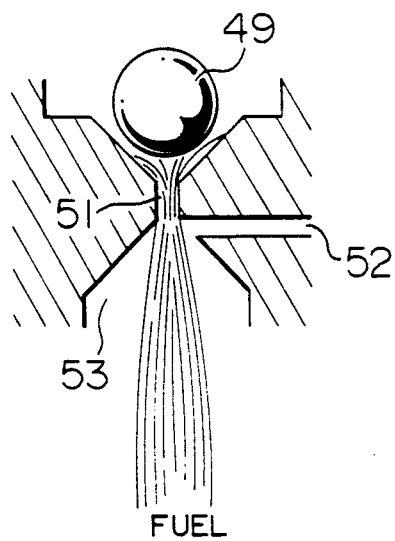
FIGS. 37A and 37B are views showing a change in the direction of fuel injection.
Figure 37B:
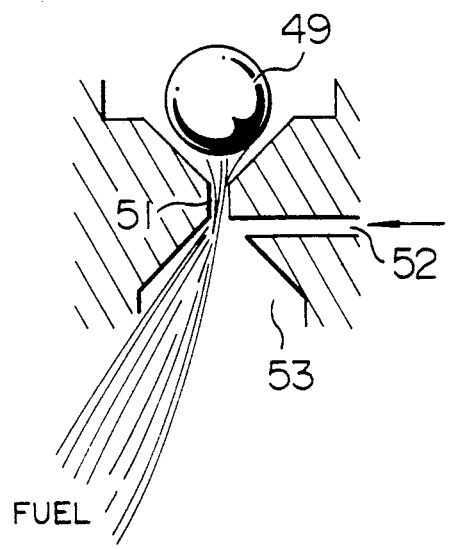

FIGS. 37A and 37B show the fuel injection condition on an enlarged scale. As shown in FIG. 37A, when the air is not flowing through the air passage 52, the fuel is injected without being deflected. As shown in FIG. 37B, when the air is flowing through the air passage 52, the air flow impinges on the injected fuel, so that the fuel injection direction is changed, that is, the injected fuel is deflected. The angle of deflection of the injected fuel varies with the amount of the air flow.

The operation of the fuel injection device of this embodiment will now be described.

Figure 38A:
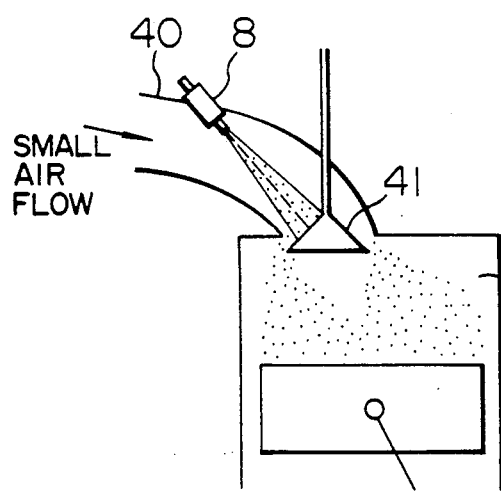
FIGS. 38A and 38B are views showing the direction of fuel injection in a conventional fuel injection device in an idling and low-load operating conditions and the direction of fuel injection in a high-load operating condition, respectively.
Figure 38B:
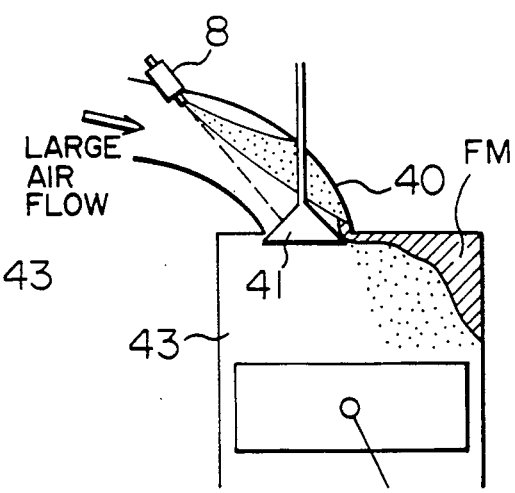

For comparison purposes, there are provided FIGS. 38A and 38B which show a conventional fuel injection device for injecting fuel without deflecting it. FIG. 38A shows an idling and low-load operating condition, and FIG. 38B shows a high-load operating condition. With respect to the direction of mounting of a fuel injection valve 8, this injection valve is directed toward an intake valve 41. This mounting direction is indicated by a dotted-line in FIGS. 38A and 38B. The injection valve 8 is fixedly mounted on an intake pipe 40. In the idling and low-load operating condition, since the velocity of the air flow in the intake pipe 40 is low, the fuel injected from the injection valve 8 is directed toward the intake valve 41 without being deflected, as shown in FIG. 38A. When the fuel is supplied to the intake valve 41, the atomized fuel is dispersed uniformly within a combustion chamber 43, thereby providing a stable combustion. On the other hand, in the high-load operating condition, the velocity of the air flow in the intake pipe 40 is high, and the fuel injected from the injection valve 8 is deflected as shown in FIG. 38B, and is deposited on the wall surface of the intake pipe 41. The deposited fuel, while being maintained in a liquid state, enters the combustion chamber 43 to form a liquid fuel film FM. When the fuel is thus present in an irregular manner within the combustion chamber 43, there occurs an unstable combustion varying from one cycle to another. In such a combustion condition, the amount of discharge of HC is large, and also the knocking is liable to occur.

Figure 39A:
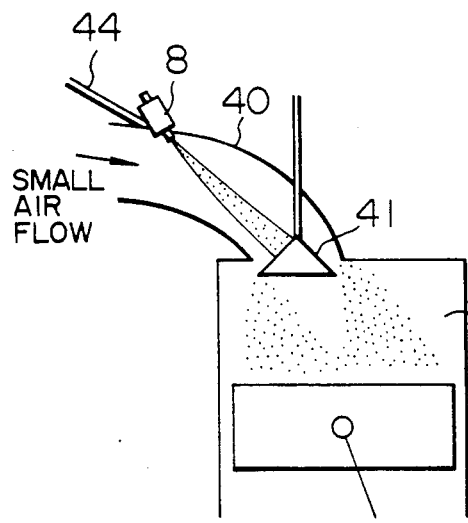
FIGS. 39A and 39B are views showing the direction of fuel injection in the embodiment of the invention in an idling and low-load operating conditions and the direction of fuel injection in a high-load operating condition, respectively.

FIGS. 39A to 39D show the operation of this embodiment. FIG. 39A shows an idling and low-load operating condition, and FIG. 39 shows a high-load operating condition. The injection valve 8 is fixedly mounted on the intake pipe 40, and with respect to the direction of mounting of the injection valve 8, this injection valve is directed toward the intake valve 41, as shown in FIG. 39A. Therefore, when the fuel is injected in the direction of mounting of the injection valve 8, the fuel is supplied to the intake valve 41.

Figure 39B:
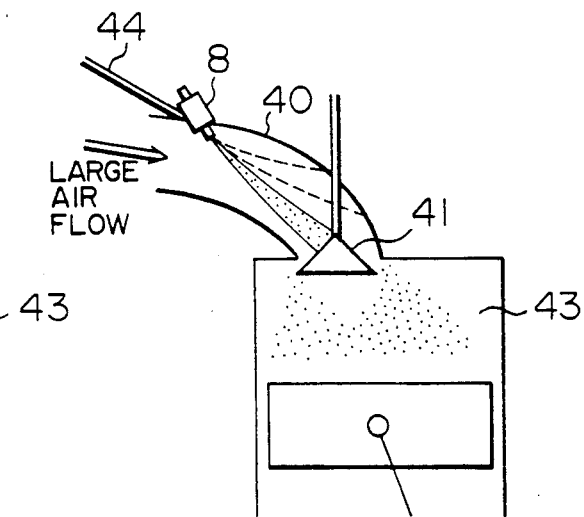

On the other hand, in the high-load operating condition, since the velocity of the air flow is high, the atomized fuel is deflected as indicated by a dotted line in FIG. 39B. In this embodiment, however, the deflection of the atomized fuel is corrected by the air flow (air stream) fed from the air passage 44, so that the atomized fuel is directed toward the intake valve 41, as shown in FIG. 39B.

Figure 39C:
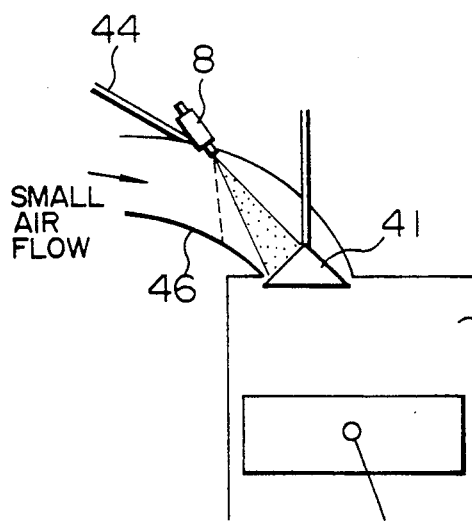
FIGS. 39C and 39D are views similar to FIGS. 39A and 39B.
Figure 39D:
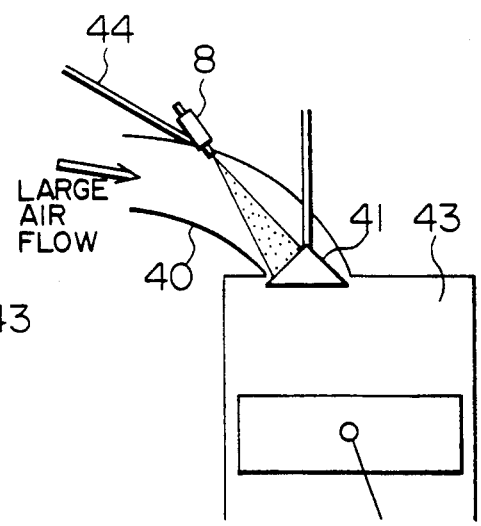

FIGS. 39C and 39D show a modified arrangement in which the direction of mounting of the injection valve 8 is directed to a point disposed forwardly of the intake valve 41.

Therefore, in the low-load operating condition, the air is supplied from the air passage 44 so as to deflect the injected fuel toward the intake valve 41.

On the other hand, in the high-load operating condition, since the velocity of the air flow in the intake pipe 40 is high, the atomized fuel is deflected by this air flow, so that the atomized fuel is directed toward the intake valve 41, as shown in FIG. 39D. Therefore, in the high-load operating condition, the air-fuel mixture distribution within the combustion chamber 43 is also made uniform.

As described above, in this embodiment, in all the operating conditions from the idling to the highload operating condition, the fuel can be injected to the predetermined position of the intake valve, and therefore the stable combustion can always be obtained without causing cyclic variations.

Another embodiment of the invention will now be described with reference to FIG. 40. In this embodiment, the portion for changing the direction of injection of fuel is provided on an intake pipe.

Figure 40:
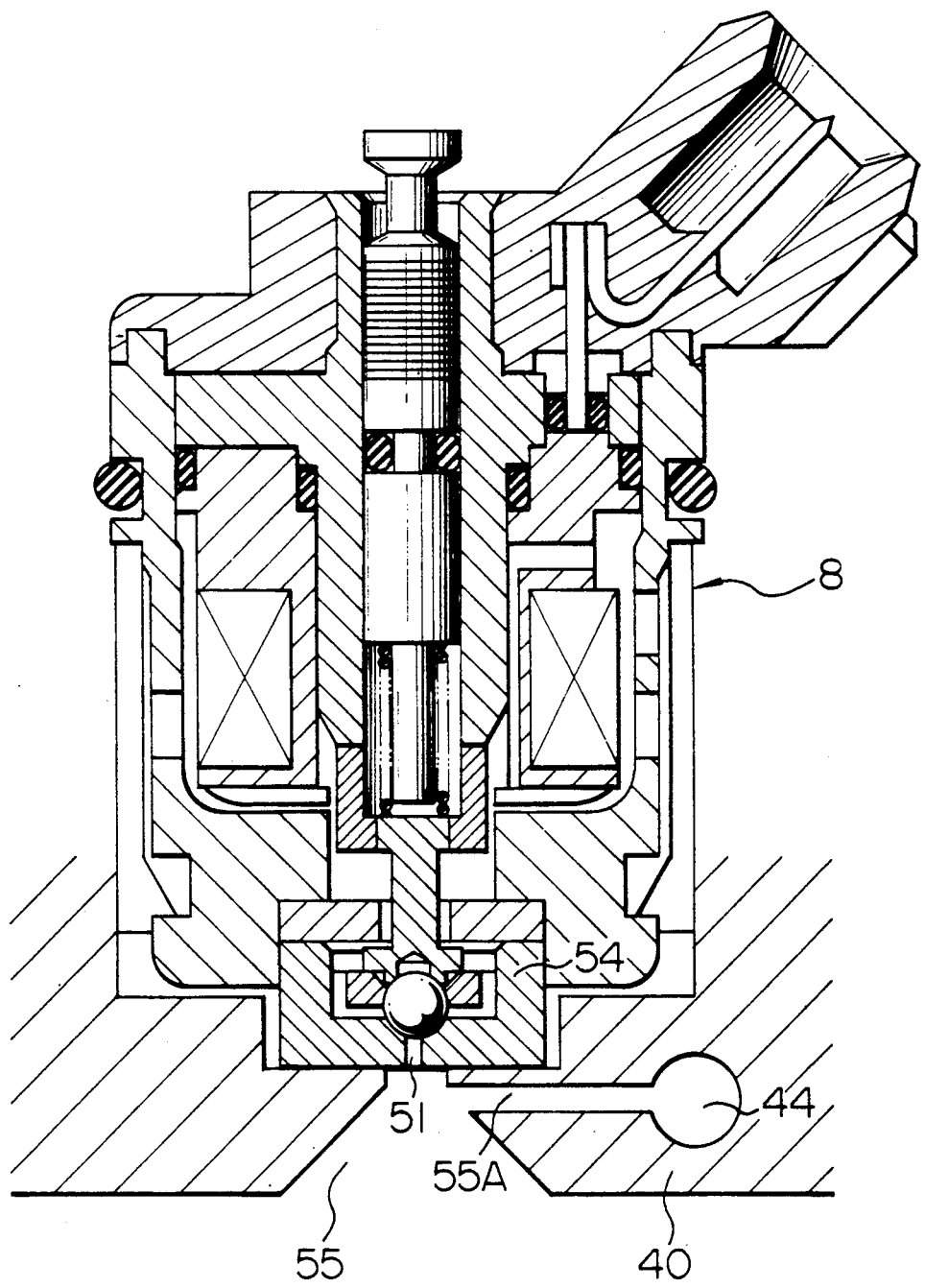
FIG. 40 is cross-sectional view of a modified fuel injection device of the invention.

In FIG. 40, a fuel injecting portion 54 of a fuel injection valve 8 is of an ordinary construction. An air passage 55A and a flaring port portion 55 are formed in each of injection valve-mounting portions of the intake pipe 40 corresponding respectively to cylinders of an engine. The air passage 55A communicates with an air passage 44, and the flaring port portion 55 is disposed downstream of a metering orifice 51. The air passage 55A is open to the port portion 55.

With this arrangement, the injection valve 8 can have an ordinary construction, and therefore the same effects as achieved in the preceding embodiment can be obtained with a compact construction, without the need for modifying the injection valve.

Figure 41:
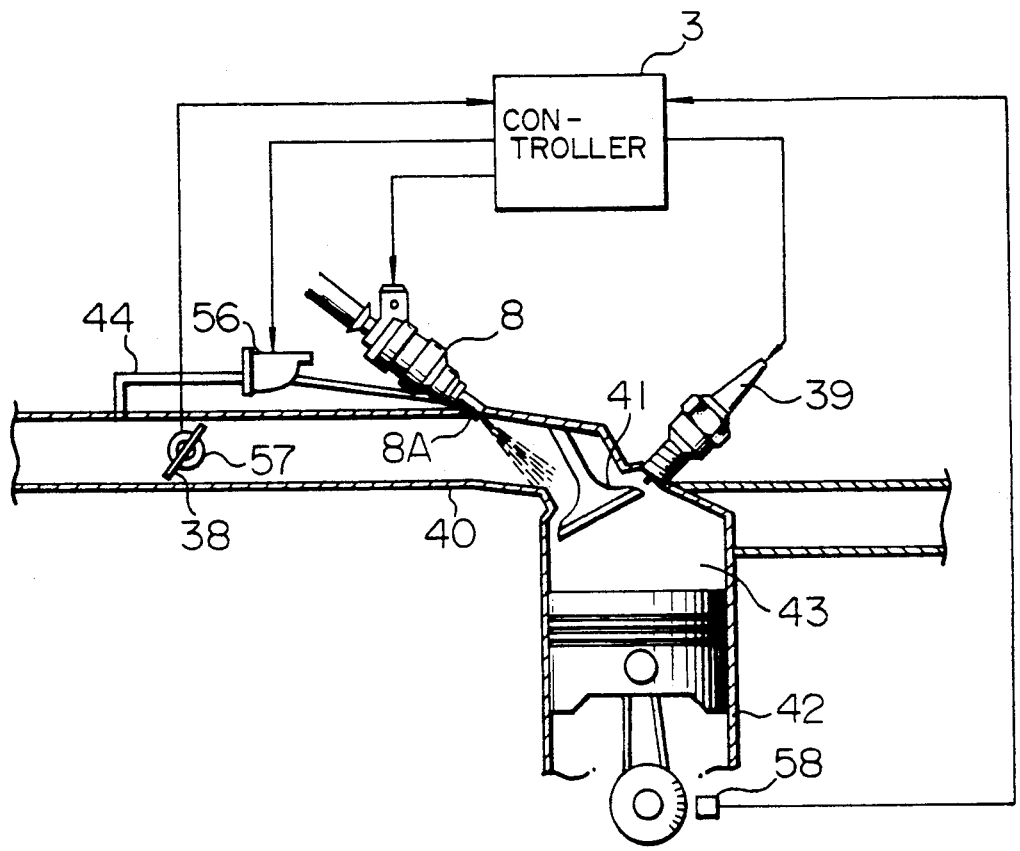
FIG. 41 is a schematic view of another modified fuel injection device of the invention.
Figure 42:
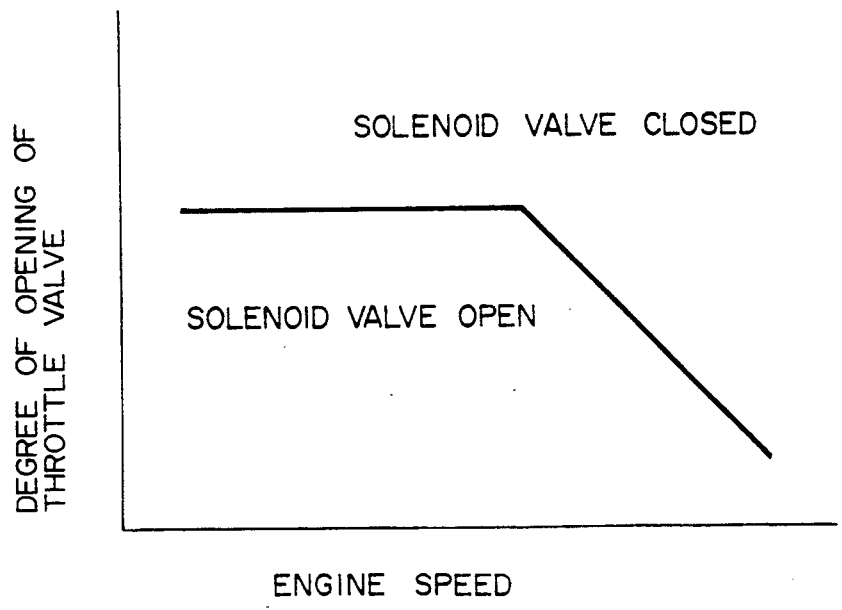
FIG. 42 is a graph showing the operation of a solenoid valve.

A further embodiment of the invention will be described with reference to FIGS. 41 and 42.

In this embodiment, the direction of injection of fuel from a fuel injection valve 8 is directed to a point disposed forwardly of an intake valve 41, as in FIG. 39C.

In a low-load operating condition, a solenoid passage 44.

More specifically, in the idling and low-load operating condition, the degree of opening of a throttle valve 38 is small, so that that portion of an intake pipe 40 disposed downstream of the throttle valve 38 is under a negative pressure. Therefore, an air flow is caused in the air passage 44, so that the injected fuel is deflected, as in FIG. 39C. As a result, the atomized fuel is directed toward the intake valve 41.

On the other hand, in the high-load operating condition, the solenoid valve 56 is closed, and at this time the injected fuel is deflected by the air flow, passing through the intake pipe 40, so as to be directed to the intake valve 41.

The operation of the solenoid valve 56 is determined by a map (FIG. 42) determined by a throttle sensor 57 and a rotation sensor 58.

Thus, in this embodiment, in the high-load operating condition, the solenoid valve 56 is closed to shut off the bypass air flow, and the bypass air flow can be introduced only in the desired operating condition, so that the direction of injection of the fuel can be controlled more accurately.

A further embodiment of the invention will be described with reference to FIG. 43. In this embodiment, the direction of injection of fuel is changed by other air flow than the air flow bypassing a throttle valve.

Figure 43:
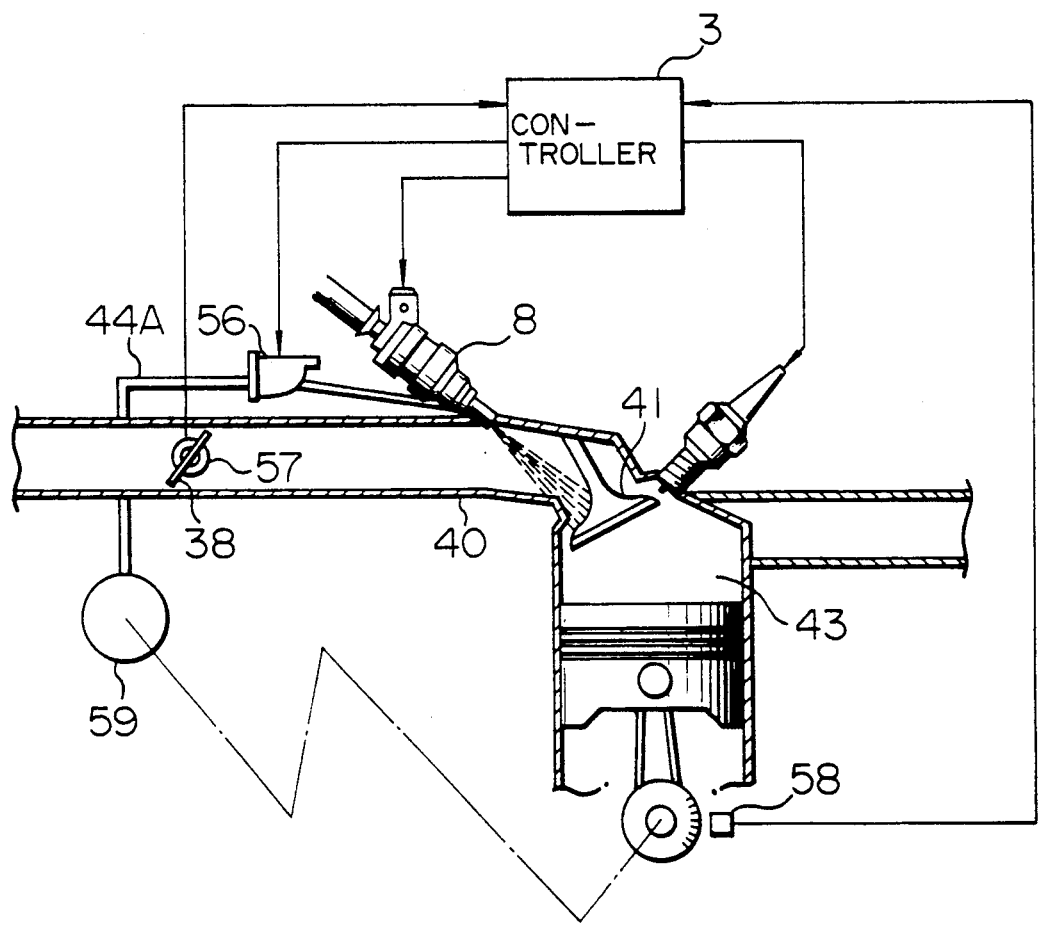
FIG. 43 is a schematic view of a further modified fuel injection device of the invention.

In FIG. 43, an air pump 59 is used as an air source. The air pump 59 is driven by a crank shaft, or may be driven by an electric motor. An air flow produced by the air pump 59 is fed to a fuel injection valve 8 via an air passage 44A. A solenoid valve 56 is provided on the air passage 44A, and is controlled by a controller 3, as is the case with the solenoid valve of FIG. 42. In this embodiment, similar effects as described for the embodiment of FIG. 41 can be obtained.

Figure 44A:
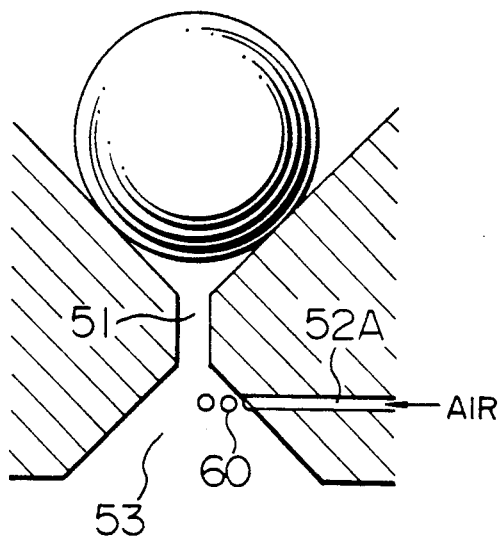
FIG. 44A is a fragmentary, enlarged view of a further modified fuel injection device of the invention.
Figure 44B:
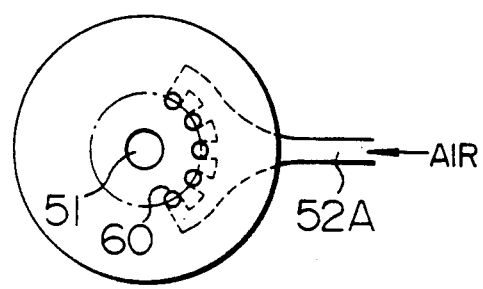
FIG. 44B is a bottom view of that portion shown in FIG. 44A.

A further embodiment of the invention will be described with reference to FIGS. 44A and 44B. In this embodiment, modified air introducing holes are provided at a port portion.

In the embodiment of FIG. 36, only one air outlet for discharging the air flow bypassing the throttle valve 38 is provided at the port portion 53. In this case, there is a possibility that the air fail to impinge on the whole of the injected fuel. For this reason, in this embodiment of FIG. 44, a plurality of air outlets 60 are provided at a port portion 53, and an air passage 52A is so shaped as to distribute the air to the plurality of air outlets 60. With this arrangement, the air can positively impinge on the whole of the injected fuel, so that the control of the fuel injection direction can be made more accurately.

Figure 46A:
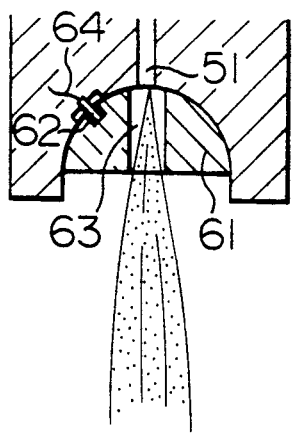
FIGS. 46A and 46B are views showing the position of a rotatable member in idling and low-load operating conditions and the position of the rotatable member in a high-load operating condition, respectively.
Figure 46B:
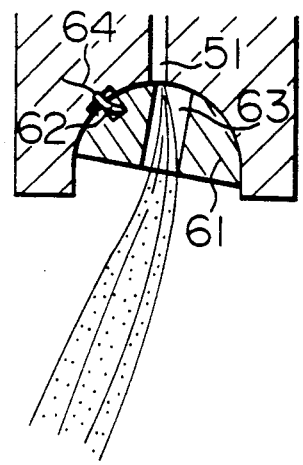

A further embodiment of the invention will be described with reference to FIGS. 45, 46A and 46B. In this embodiment, the control of the fuel injection direction is made by other means than the air flow.

Figure 45:
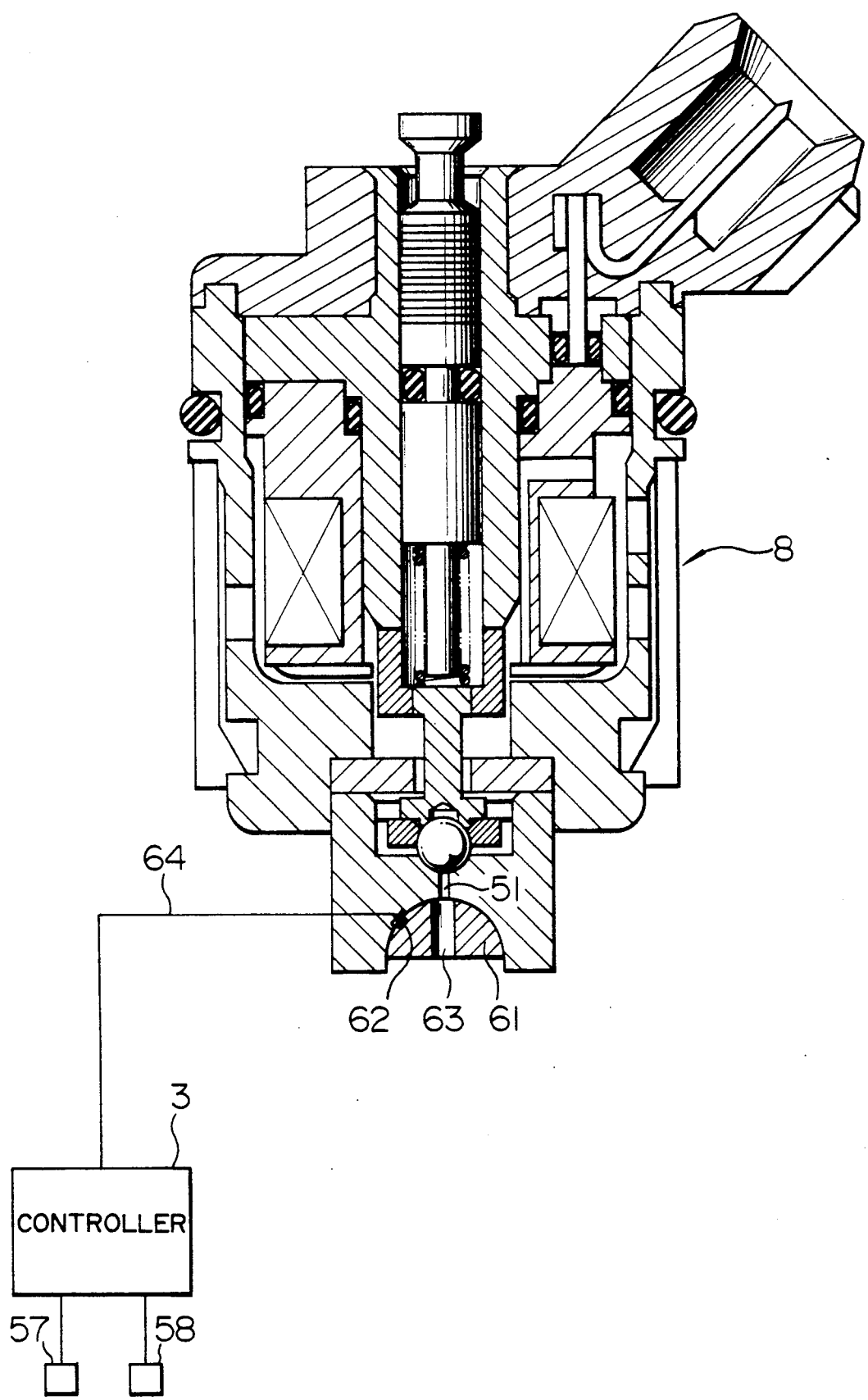
FIG. 45 is a cross-sectional view of a further modified fuel injection device of the invention.

In a fuel injection device of this embodiment shown in FIG. 45, a rotatable member 61 of a semispherical shape for changing the direction of fuel injection is provided downstream of a metering orifice 51 of a fuel injection valve 8. A temperature-sensitive drive member 62 for rotating the rotatable member 61 is provided on the rotatable member 61, and an injection hole 63 is formed in the rotatable member 61. The temperature-sensitive drive member 62 comprises a laminate of a bimetal and a plate-like heater. When electric current is supplied to this heater via an electric wire 64 under the control of a controller 3, the bimetal is deformed to thereby rotate the rotatable member 61.

The operation of this embodiment will now be described with reference to FIGS. 46A and 46B. When electric current is not supplied to the temperature-sensitive drive member 62 via the electric wire 64, the temperature-sensitive drive member 62 is not deformed as shown in FIG. 46A. Therefore, the rotatable member 61 is not rotated, and the injection hole 63 is directed accurately downward, as is the case with the metering orifice 51. When electric current is supplied to the temperature-sensitive drive member 62, the temperature-sensitive drive member 62 is deformed as shown in FIG. 46B. Therefore, the rotatable member 61 is rotated, so that the direction of the injection hole 63 is changed. In this manner, the injection direction can be electrically changed at a desired time.

A further embodiment of the invention will be described with reference to FIGS. 47A to 47C. This embodiment is applied to the type of internal combustion engine in which the engine speed is less high than the engines of the above embodiments, and the degree of deflection of the injected fuel by the air flow (passing through the intake pipe) in the high-load operating condition is less than that of the above embodiments. In this embodiment, the direction of injection of the fuel is deflected or deviated from the center of the intake valve 40 in the idling condition.

Figure 47A:
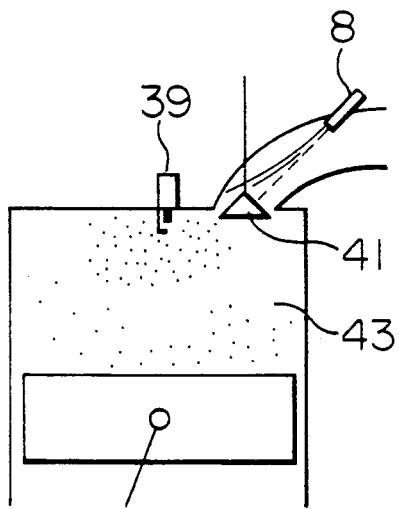
FIGS. 47A and 47B are views showing the operation of a further modified fuel injection device in an idling condition and its operation in a high-load operating condition, respectively.
Figure 47B:
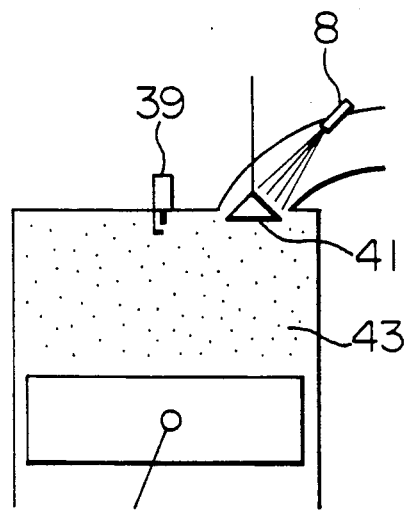
Figure 47C:
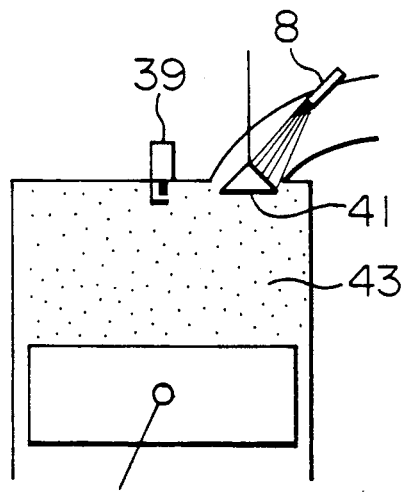
FIG. 47C is a view showing the operation of a conventional fuel injection device in an idling condition.

In FIGS. 47A, 47B and 47C, the direction of injection of the fuel from a fuel injection valve 8 is controlled by the air flow. However, the manner and condition of deflecting the injected fuel are different from those of the above embodiments. More specifically, as indicated by a dotted line in FIG. 47A, the fuel injection valve 8 is mounted to be directed to generally the center of the intake valve 41. During the idling operation, as shown in FIG. 47A, the fuel injection direction is deflected by the air flow so as to supply the atomized fuel toward one half side of the intake valve 41 facing an ignition plug 39, so that the air-fuel mixture within a combustion chamber 43 is concentrated on the vicinity of the ignition plug 39. By doing so, the dense combustible air-fuel mixture is distributed only in the vicinity of the ignition plug 39, and the air-fuel mixture at the other portions are lean. Therefore, the range of distribution of the dense air-fuel mixture is made small, thereby improving the fuel consumption.

Conventionally, during the idling, fuel is dispersed uniformly on an intake valve 41, as shown in FIG. 47C. In such a case, the dense combustible air-fuel mixture is distributed over the entire area of the combustion chamber, which prevents the saving of the fuel. During the idling, the temperature of a head of a piston, as well as the temperature of the wall surface of the combustion chamber 43, is low, and therefore even if the air-fuel mixture is lean at these portions, there is no possibility that the knocking occurs.

In the high-load operating condition, as shown in FIG. 47B, the engine speed does not increase to the level of the above embodiments, and therefore the influence of the air flowing through the intake pipe is less, so that the atomized fuel is injected toward the intake valve 41 in generally the same manner as described for the above embodiments. As a result, the distribution of the air-fuel mixture in the combustion chamber is uniform, and a stable combustion can be obtained. Since the head of the piston and the wall surface of the combustion chamber 43 are sufficiently cooled by the air-fuel mixture, the knocking is prevented.

As the air flow for deflecting the fuel injection direction during the idling, there can be used the air flow bypassing the throttle valve as in the embodiment of FIG. 36, and in this case, as the operation is shifted from the idling to the low-load operating condition and then to the high-load operation condition, the strength of the air flow continuously increases, and in accordance with this, the direction of injection of the fuel is continuously changed. Alternatively, as in the embodiment of FIG. 41, the solenoid valve 56 can be used to shut off the air flow except during the idling, so that the fuel injection direction can be deflected only during the idling. Also, instead of using the bypass air flow, the air pump 59 may be used as the air flow-generating source, as in the embodiment of FIG. 43. Also, the direction control means not depending on the air flow, as in the embodiment of FIG. 45, may be used.

As described above, in this embodiment, during the idling, the direction of the fuel injection is not directed toward the center of the intake valve, but is directed toward the one half side of the intake valve facing the ignition plug. Therefore, the fuel consumption and the stability during the idling are improved.

Figure 48:
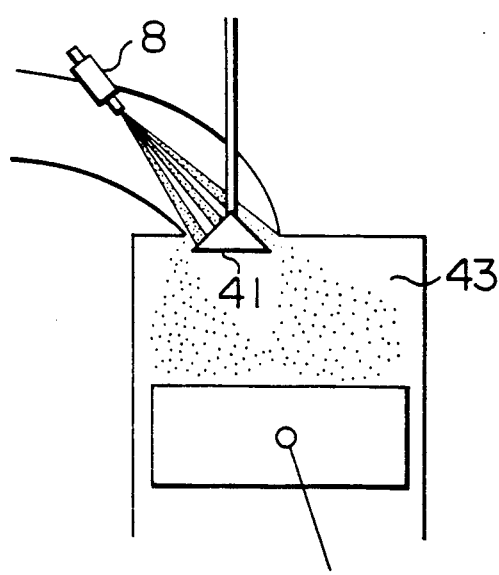
FIG. 48 is a view of a further modified fuel injection device of the invention for supplying three jets of atomized fuel.

In the above embodiments, the fuel injection valve is designed to inject a single jet of atomized fuel, but may be designed to inject a plurality of jets of atomized fuel. FIG. 48 shows one example of such fuel injection valve 8 which injects three jets of atomized fuel. When the present invention is applied to such type of fuel injection valve which injects a plurality of jets of atomized fuel, the direction of injection of the fuel is the direction of the central fuel jet, and is the direction of the central one of the three fuel jets in FIG. 48. By this direction control, similar effects as described for the above embodiments can be obtained.

As described above, the direction of injection of the fuel from the fuel injection valve can be optimally changed in accordance with the operating condition of the internal combustion engine. Therefore, the influence of the air (flowing through the intake pipe) on the direction of injection of the fuel is eliminated, and the distribution of the air-fuel mixture in the combustion chamber is uniform in all the operating conditions, and the amount of discharge of HC can be reduced, and the knocking can be prevented.

Further, since the fuel injection direction is directed toward the one half side of the intake valve facing the ignition plug during the idling, the fuel consumption an stability during the idling can be improved.

What is claimed is:

1. A fuel supply system for an internal combustion engine wherein an operating condition of the internal combustion engine is detected, and the amount of fuel supply is controlled in accordance with the result of said detection, the fuel supply system comprising:

fuel nature detection means for detecting the nature of the fuel;

calculation means for calculating a theoretical air-fuel ratio, corresponding to the nature of the fuel, in accordance with the result of the detection by said fuel nature detection means; and means for controlling the fuel supply amount, using the theoretical air-fuel ratio obtained by said calculating means as a target air-fuel ratio, in accordance with a result of said operating condition of the internal combustion engine, which said fuel nature detection means comprise a device which measures a refractive index of the fuel in a liquid state, and calculates a boiling point of the fuel from the result of said measurement, thereby detecting the nature of the fuel.

2. A fuel supply system for an internal combustion engine wherein an operating condition of the internal combustion engine is detected, and the amount of fuel supply is controlled in accordance with the result of said detection, the fuel supply system comprising:

fuel nature detection means for detecting the nature of the fuel;

calculation means for calculating a theoretical air-fuel ratio, corresponding to the nature of the fuel, in accordance with the result of the detection by said fuel nature detection means; and means for controlling the fuel supply amount, using the theoretical air-fuel ratio obtained by said calculating means as a target air-fuel ratio, in accordance with a result of said operating condition of the internal combustion engine, in which said fuel nature detection means comprises an optical fiber member having at least one bent portion dipped in the fuel in a liquid state, the nature of the fuel being detected by a change in the amount of transmission of light through said optical fiber member.

3. A fuel supply system according to claim 2, in which said optical fiber member comprises a quartz fiber having a refractive index of not less than 1.45.

4. A fuel supply system according to claim 2, in which said optical fiber member is sealed by at least one of low-melting glass fused thereto, an adhesive bonded thereto, and an O-ring attached thereto.

5. A fuel supply system according to claim 2, wherein the nature of the fuel detected by the fuel nature detection means is the nature of gasoline.

6. An engine control method comprising the steps of supplying mixed fuel of alcohol and gasoline from a fuel injection valve to an engine; detecting an oxygen concentration in exhaust gas and controlling the amount of supply of the fuel from said fuel injection valve in such a manner as to feedback-control the exhaust gas to a theoretical air-fuel ratio; detecting a mixture percentage Ms of the mixed fuel to be supplied to the engine by a fuel nature sensor; finding from said oxygen concentration a mixture percentage $M_{O_2}$ during the feedback control; judging whether the value of a feedback coefficient $\alpha$ is smaller than, equal to or larger than 1 if $Ms < M_{O_2}$ is obtained; and correcting the amount of supply of the fuel from said fuel injection valve at the time of the air-fuel ratio control if $\alpha > 1$ is obtained, judging that said fuel injection valve is supplying the fuel of an amount smaller than a calculated value.

7. An engine fuel supply system wherein mixed fuel of alcohol and gasoline is supplied from a fuel injection valve to an engine, an oxygen concentration in exhaust gas is detected, and the amount of supply of the fuel from said fuel injection valve is controlled in such a manner as to feedback-control the exhaust gas to a theoretical air-fuel ratio comprising a fuel nature sensor for detecting a mixture percentage Ms of the mixed fuel to be supplied to the engine; means for finding from said oxygen concentration a mixture percentage $M_{O_2}$ during the feedback control; means for judging whether the value of a feedback coefficient $\alpha$ is smaller than, equal to or larger than 1 if $Ms < M_{O_2}$ is obtained; and means for correcting the amount of supply of the fuel from said fuel injection valve at the time of the air-fuel ratio control if $\alpha > 1$ is obtained, judging that said fuel injection valve is supplying the fuel of an amount smaller than a calculated value.

8. An engine fuel control method comprising the steps of supplying mixed fuel of alcohol and gasoline from a fuel injection valve to an engine; detecting an oxygen concentration in exhaust gas and controlling the amount of supply of the fuel from said fuel injection exhaust gas to a theoretical air-fuel ratio; detecting a mixture percentage Ms of the mixed fuel to be supplied to the engine by a fuel nature sensor; finding from said oxygen concentration a mixture percentage $M_{O_2}$ during the feedback control; judging whether the value of a feedback coefficient $\alpha$ is smaller than, equal to or larger than 1 if $Ms < M_{O_2}$ is obtained; and effecting a high octane-mode air-fuel ratio control and a high octane-mode ignition timing control if $\alpha \leq 1$ is obtained, judging that said gasoline is of the high octane type.

9. An engine fuel supply system wherein mixed fuel of alcohol and gasoline is supplied from a fuel injection valve to an engine; an oxygen concentration in exhaust gas is detected, and the amount of supply of the fuel from said fuel injection valve is controlled in such a manner as to feedback-control the exhaust gas to a theoretical air-fuel ratio; a fuel nature sensor for detecting a mixture percentage Ms of the mixed fuel to be supplied to the engine; means for finding from said oxygen concentration a mixture percentage $M_{O_2}$ during the feedback control; means for judging whether the value of a feedback coefficient $\alpha$ is smaller than, equal to or larger than 1 if $Ms < M_{O_2}$ is obtained; and means for effecting a high octane-mode air-fuel ratio control and a high octane-mode ignition timing control if $\alpha \leq 1$ is obtained, judging that said gasoline is of the high octane type.

10. An engine fuel control method comprising the steps of supplying mixed fuel of a plurality of kinds of feedback-controlling the amount of supply of the mixed fuel to the engine in such a manner that an air-fuel ratio of an exhaust gas is brought to a theoretical air-fuel ratio; detecting a mixture percentage Ms of the mixed fuel to be supplied to the engine by a fuel nature sensor; finding from the air-fuel ratio of the exhaust gas a mixture percentage $M_{O_2}$ during the feedback control; judging whether the value of a feedback coefficient $\alpha$ is smaller than, equal to or larger than 1 if $Ms < M_{O_2}$ is obtained; and correcting the amount of supply of the fuel from said fuel injection valve at the time of the air-fuel ratio control if $\alpha > 1$ is obtained, judging that said fuel injection valve is deteriorated.

11. An engine fuel supply system wherein mixed fuel of a plurality of kinds of fuels is supplied from a fuel injection valve to an engine, and the amount of supply of the mixed fuel to the engine is feedback-controlled in such a manner that an air-fuel ratio of an exhaust gas is brought to a theoretical air-fuel ratio, comprising a fuel nature sensor for detecting a mixture percentage Ms of the mixed fuel to be supplied to the engine; means for finding from the air-fuel ratio of the exhaust gas a mixture percentage $M_{o2}$ during the feedback control; means for judging whether the value of a feedback coefficient $\alpha$ is smaller than, equal to or larger than 1 if $Ms < M_{o2}$ is obtained; and means for correcting the amount of supply of the fuel from said fuel injection valve at the time of the air-fuel ratio control if $\alpha > 1$ is obtained, judging that said fuel injection valve is deteriorated.

12. An engine fuel control method comprising the steps of supplying mixed fuel of a plurality of kinds of fuels, including gasoline, from a fuel injection valve to an engine; feedback-controlling the amount of supply of the mixed fuel to the engine in such a manner that an air-fuel ratio of an exhaust gas is brought to a theoretical air-fuel ratio; detecting a mixture percentage Ms of the mixed fuel to be supplied to the engine by a fuel nature sensor; finding from the air-fuel ratio of the exhaust gas a mixture percentage $M_{o2}$ during the feedback control; judging whether the value of a feedback coefficient $\alpha$ is smaller than, equal to or larger than 1 if $Ms < M_{o2}$ is obtained; and effecting a high octane-mode air-fuel ratio control and a high octane-mode ignition timing control if $\alpha \leq 1$ is obtained, judging that said gasoline is of the high octane type.

13. An engine fuel supply system wherein mixed fuel of a plurality of kinds of fuels, including gasoline, is supplied from a fuel injection valve to an engine, comprising and the amount of supply of the mixed fuel to the engine is feedback-controlled in such a manner that an air-fuel ratio of an exhaust gas is brought to a theoretical air-fuel ratio, comprising:

a fuel nature sensor for detecting a mixture percentage Ms of the mixed fuel to be supplied to the engine; means for finding from the air-fuel ratio of the exhaust gas a mixture percentage $M_{o2}$ during the feedback control; means for judging whether the value of a feedback coefficient $\alpha$ is smaller than, equal to or larger than 1 if $Ms < M_{o2}$ is obtained; ratio control and a high octane-mode ignition timing control if $\alpha \leq 1$ is obtained, judging that said gasoline is of the high octane type.

14. An engine fuel control method comprising the steps of supplying mixed fuel of alcohol and gasoline from a fuel injection valve to an engine; detecting an oxygen concentration in exhaust gas and controlling the amount of supply of the fuel from said fuel injection valve in such a manner as to feedback-control the exhaust gas to a theoretical air-fuel ratio; detecting a mixture percentage Ms of the mixed fuel to be supplied to the engine by a fuel nature sensor; finding from said oxygen concentration a mixture percentage $M_{o2}$ during the feedback control; finding an amount of correction of an output of said fuel nature sensor by the value of $M_{o2}$ if $Ms > M_{o2}$ is obtained, and storing said correction amount; finding the amount of the fuel to be supplied to the engine, using the value of the output of said fuel nature sensor corrected by said correction amount, to thereby control the air-fuel ratio, when the operating region of the engine is other regions than a feedback operating region, or an engine warming region; judging whether the value of a feedback coefficient $\alpha$ is smaller than, equal to or larger than 1 if $Ms < M_{o2}$ is obtained; and correcting the amount of supply of the fuel from said fuel injection valve at the time of the air-fuel ratio control if $\alpha > 1$ is obtained, judging that said fuel injection valve is supplying the fuel of an amount smaller than a calculated value.

15. An engine fuel supply system wherein mixed fuel of alcohol and gasoline is supplied from a fuel injection valve to an engine, an oxygen concentration in exhaust gas is detected, and the amount of supply of the fuel from said fuel injection valve is controlled in such a manner as to feedback-control the exhaust gas to a theoretical air-fuel ratio, comprising a fuel nature sensor for detecting a mixture percentage Ms of the mixed fuel to be supplied to the engine; means for finding from said oxygen concentration a mixture percentage $M_{o2}$ during the feedback control; means for finding an amount of correction of an output of said fuel nature sensor by the value of $M_{o2}$ if $Ms > M_{o2}$ is obtained, and for storing said correction amount; means for finding the amount of the fuel to be supplied to the engine, using the value of the output of said fuel nature sensor corrected by said correction amount, to thereby control the air-fuel ratio, when the operating region of the engine is other regions than a feedback operating region, or an engine warming region; means for judging whether the value of a feedback coefficient $\alpha$ is smaller and means for correcting the amount of supply of the fuel from said fuel injection valve at the time of the air-fuel ratio control if $\alpha > 1$ is obtained, judging that said fuel injection valve is supplying the fuel of an amount smaller than a calculated value.

16. An engine fuel control method comprising the steps of supplying mixed fuel of alcohol and gasoline from a fuel injection valve to an engine; detecting an oxygen concentration in exhaust gas and controlling the amount of supply of the fuel from said fuel injection valve in such a manner as to feedback-control the exhaust gas to a theoretical air-fuel ratio; detecting a mixture percentage Ms of the mixed fuel to be supplied to the engine by a fuel nature sensor; finding from said oxygen concentration a mixture percentage $M_{o2}$ during the feedback control; finding an amount of correction of an output of said fuel nature sensor by the value of $M_{o2}$ if $Ms > M_{o2}$ is obtained, and storing said correction amount; finding the amount of the fuel to be supplied to the engine, using the value of the output of said fuel nature sensor corrected by said correction amount, to thereby control the air-fuel ratio, when the operating region of the engine is other regions than a feedback operating region, or an engine warming region; judging whether the value of a feedback coefficient $\alpha$ is smaller than, equal to or larger than 1 if $Ms < M_{o2}$ is obtained; fuel injection valve at the time of the air-fuel ratio control if $\alpha > 1$ is obtained, judging that said fuel injection valve is supplying the fuel of an amount smaller than a calculated value; and effecting a high octane-mode air-fuel ratio control and a high octanemode ignition timing control if $MS < M_{o2}$ and $\alpha \leq 1$ are obtained, judging that said gasoline is of the high octane type.

17. An engine fuel supply system wherein mixed fuel of alcohol and gasoline is supplied from a fuel injection valve to an engine, and an oxygen concentration in exhaust gas is detected, and the amount of supply of the fuel from said fuel injection valve is controlled in such a manner as to feedback-control the exhaust gas to a theoretical air-fuel ratio, comprising a fuel nature sensor for detecting a mixture percentage Ms of the mixed fuel to be supplied to the engine; means for finding from said oxygen concentration a mixture percentage $M_{o2}$ during the feedback control; means for finding an amount of correction of an output of said fuel nature sensor by the value of $M_{o2}$ if $Ms > M_{o2}$ is obtained, and for storing said correction amount; means for finding the amount of the fuel to be supplied to the engine, using the value of the output of said fuel nature sensor corrected by said correction amount, to thereby control the air-fuel ratio, when the operating region of the engine is other regions than a feedback operating region, or an engine warming region; means for judging whether the value of a feedback coefficient $\alpha$ is smaller than, equal to or larger than 1 if $Ms < M_{o2}$ is obtained; and means for correcting the amount of supply of the fuel from said fuel injection valve at the time of the air-fuel ratio control if $\alpha > 1$ is obtained, judging that said fuel injection valve is supplying the fuel of an amount smaller than a calculated value, and means for effecting a high octane-mode air-fuel ratio control and a high octane-mode ignition timing control if $MS < M_{o2}$ and $\alpha \leq 1$ are obtained, judging that said gasoline is of the high octane type.

18. An engine fuel control method comprising the steps of supplying mixed fuel of a plurality of kinds of fuels from a fuel injection valve to an engine; feedback-controlling the amount of supply of the mixed fuel to the engine in such a manner that an air-fuel ratio of an exhaust gas is brought to a theoretical air-fuel ratio; detecting a mixture percentage Ms of the mixed fuel to be supplied to the engine by a fuel nature sensor; finding from the air-fuel ratio of the exhaust gas a mixture percentage $M_{o2}$ to be found; finding an amount of correction of an output of said fuel nature sensor by the value of $M_{o2}$ if $Ms > M_{o2}$ is obtained, judging that said fuel nature sensor is deteriorated, and storing said correction amount; effecting the air-fuel ratio control, using the value of the output of said fuel nature sensor corrected by said correction amount, except when the amount of supply of the fuel to the engine is feedback-controlled; judging whether the value of a feedback coefficient $\alpha$ is smaller than, equal to or larger than 1 if $Ms < M_{o2}$ is obtained; and correcting the amount of supply of the fuel from said fuel injection valve at the time of the air-fuel ratio control if $\alpha > 1$ is obtained, judging that said fuel injection valve is deteriorated.

19. An engine fuel supply system wherein mixed fuel of a plurality of kinds of fuels is supplied from a fuel injection valve to an engine, and the amount of supply of the mixed fuel to the engine is feedback-controlled in such a manner that an air-fuel ratio of an exhaust gas is brought to a theoretical air-fuel ratio, comprising a fuel nature sensor for detecting a mixture percentage Ms of the mixed fuel to be supplied to the engine; means for finding from the air-fuel ratio of the exhaust gas a mixture percentage $M_{o2}$ to be found; means for finding an amount of correction of an output of said fuel nature sensor by the value of $M_{o2}$ if $Ms > M_{o2}$ is obtained, judging that said fuel nature sensor is deteriorated, and for storing said correction amount; means for effecting the air-fuel ratio control, using the value of the Output of said fuel nature sensor corrected by said correction amount, except when the amount of supply of the fuel to the engine is feedback-controlled; means for judging whether the value of a feedback coefficient $\alpha$ is smaller than, equal to or larger than 1 if $Ms < M_{o2}$ is obtained; and means for correcting the amount of supply of the fuel from said fuel injection valve at the time of the air-fuel ratio control if $\alpha > 1$ is obtained, judging that said fuel injection valve is deteriorated.

20. An engine fuel control method comprising the steps of supplying mixed fuel of a plurality of kinds of fuels, including gasoline, from a fuel injection valve to an engine; feedback-controlling the amount of supply of the mixed fuel to the engine in such a manner that an air-fuel ratio of an exhaust gas is brought to a theoretical air-fuel ratio; detecting a mixture percentage Ms of the mixed fuel to be supplied to the engine by a fuel nature sensor; finding from the air-fuel ratio of the exhaust gas a mixture percentage $M_{o2}$ to be found; finding an amount of correction of an output of said fuel nature sensor by the value of $M_{o2}$ if $Ms > M_{o2}$ is obtained, judging that said fuel nature sensor is deteriorated, and storing said correction amount; effecting the air-fuel ratio control, using the value of the output of said fuel nature sensor corrected by said correction amount, except when the amount of supply of the fuel to the engine is feedback-controlled; udging whether the value of a feedback coefficient is smaller than, equal to or larger than 1 if $Ms < M_{o2}$ is obtained; correcting the amount of supply of the fuel from said fuel injection valve at the time of the air-fuel ratio control if $\alpha > 1$ is obtained, judging that said fuel injection valve is deteriorated; and effecting a high octane-mode air-fuel ratio control and a high octane-mode ignition timing control if $MS < M_{o2}$ and $\alpha \leq 1$ are obtained, judging that said gasoline is of the high octane type.

21. An engine fuel supply system wherein mixed fuel of a plurality of kinds of fuels, including gasoline, is supplied from a fuel injection valve to an engine, and the amount of supply of the mixed fuel to the engine is feedback-controlled in such a manner that an air-fuel ratio of an exhaust gas is brought to a theoretical air-fuel ratio, comprising a fuel nature sensor for detecting a mixture percentage Ms of the mixed fuel to be supplied to the engine; means for finding from the air-fuel ratio of the exhaust gas a mixture percentage $M_{o2}$ to be found; means for finding an amount of correction of an output of said fuel nature sensor by the value of $M_{o2}$ if $Ms > M_{o2}$ is obtained, judging that said fuel nature sensor is deteriorated, and for storing said correction amount; means for effecting the air-fuel ratio control, using the value of the output of said fuel nature sensor corrected by said correction amount, except when the amount of supply of the fuel to the engine is feedback-controlled; means for judging whether the value of a feedback coefficient $\alpha$ is smaller than, equal to or larger than 1 if $Ms < M_{o2}$ is obtained; means for correcting the amount of supply of the fuel from said fuel injection valve at the time of the air-fuel ratio control if $\alpha > 1$ is obtained, judging that said fuel injection valve is deteriorated; and means for effecting a high octane-mode air-fuel ratio control and a high octane-mode ignition timing control if $MS < M_{o2}$ and $\alpha \leq 1$ are obtained, judging that said gasoline is of the high octane type.

22. An engine fuel control method comprising the steps of supplying mixed fuel of a plurality of kinds of fuels from a fuel injection valve to an engine; feedback-controlling the amount of supply of the mixed fuel to the engine in such a manner that an air-fuel ratio of an exhaust gas is brought to a theoretical air-fuel ratio; detecting a mixture percentage Ms of the mixed fuel to be supplied to the engine by a fuel nature sensor; finding from the air-fuel ratio of the exhaust gas a mixture percentage $Mo_2$ to be found; finding an amount of correction of an output of said fuel nature sensor by the value of $Mo_2$ if $Ms > Mo_2$ is obtained, judging that said fuel nature sensor is deteriorated, and storing said correction amount; and effecting the air-fuel ratio control, using the value of the output of said fuel nature sensor corrected by said correction amount, except when the amount of supply of the fuel to the engine is feedback-controlled.

23. An engine fuel supply system wherein mixed fuel of a plurality of kinds of fuels is supplied from a fuel injection valve to an engine, and the amount of supply of the mixed fuel to the engine is feedback-controlled in such a manner that an air-fuel ratio of an exhaust gas is brought to a theoretical air-fuel ratio, comprising a fuel nature sensor for detecting a mixture percentage Ms of the mixed fuel to be supplied to the engine by a fuel nature sensor; means for finding from the air-fuel ratio of the exhaust gas a mixture percentage $Mo_2$ to be found; means for finding an amount of correction of an output of said fuel nature sensor by the value of $Mo_2$ if $Ms > Mo_2$ is obtained, judging that said fuel nature sensor is deteriorated, and for storing said correction amount; and means for effecting the air-fuel ratio control, using the value of the output of said fuel nature sensor corrected by said correction amount, except when the amount of supply of the fuel to the engine is feedback-controlled.

24. A fuel injection device comprising a fuel injection valve fixedly mounted on an intake pipe so as to inject at least one jet of atomized fuel toward an intake valve; and direction control means for controlling the direction of injection of said atomized fuel from said fuel injection valve in at least one of a low-load operating condition and a high-load operating condition of an engine whereby said atomized fuel jet is directed toward generally the same position on said intake valve in both of said low-load and high-load operating conditions.

25. A fuel injection device according to claim 24, in which said fuel injection valve is directed toward other positions than said same position so that in said high-load operating condition, said atomized fuel jet can be directed toward said same position under the influence of the air flowing through said intake pipe, said direction control means controlling the direction of injection of said atomized fuel jet in said low-load operating condition.

26. A fuel injection device according to claim 24, in which said direction control means includes a movable injection hole disposed at a downstream side of a metering orifice of said fuel injection valve, and means for controlling the direction of said movable injection hole so as to control the direction of injection of said atomized fuel jet.

27. A fuel injection device according to claim 24, in which said direction control means is contained in a fuel injecting portion of said fuel injection valve.

28. A fuel injection device according to claim 24, in which said direction control means is disposed downstream of a fuel injecting portion of said fuel injection valve, and is mounted on said intake valve.

29. A fuel injection device according to claim 24, in which said direction control means is air stream generating means for feeding an air stream to a down-stream side of a metering orifice of said fuel injection valve so as to cause said air stream to impinge on said atomized fuel jet, thereby controlling the direction of injection of said atomized fuel jet.

30. A fuel injection device according to claim 29, in which said air stream generating means comprises guide means for guiding the air stream, bypassing a throttle valve, to the downstream side of said metering orifice.

31. A fuel injection device according to claim 29, in which said air stream generating means comprises an air pump for producing the air stream, and guide means for guiding the air stream to the downstream side of said metering orifice.

32. A fuel injection device according to claim 29, in which said air stream generating means comprises a solenoid valve for controlling the air stream to be guided to the downstream side of said metering orifice.

33. A fuel supply system for an internal combustion engine wherein an operating condition of the internal combustion engine is detected, and an amount of fuel supply through a fuel injector valve is controlled based on result of said detection; the fuel supply system comprising:

valve-deterioration detection means for detecting deterioration of the fuel injector valve;

calculation means for calculating a theoretical air-fuel ratio, corresponding to the deterioration of the fuel injector valve, in accordance with a result of the detection by the valve-deterioration detection means; and fuel supply control means for controlling the fuel supply amount using the theoretical air-fuel ratio, obtained by the calculation means, as a target air fuel ratio in addition to the operating condition of the internal combustion engine.

34. A fuel supply system for an internal combustion engine wherein an operating condition of the internal combustion engine is detected, and an amount of fuel supply through a fuel injector valve is controlled based on a result of said detection; the fuel supply system comprising:

fuel nature sensor means for detecting nature of the fuel;

fuel-nature-sensor-deterioration detection means for detecting deterioration of the fuel nature sensor means;

calculation means for calculating a theoretical air-fuel ratio, corresponding to the nature of the fuel and the deterioration of the fuel nature sensor means, in accordance with results of the detections by the fuel nature sensor means and the fuel-nature-sensor-deterioration detection means; and fuel supply control means for controlling the fuel supply amount using the theoretical air-fuel ratio, obtained by the calculation means, as a target air fuel ratio in addition to the operating condition of the internal combustion engine.

35. A fuel supply system for an internal combustion engine wherein an operating condition of the internal combustion engine is detected, and an amount of fuel supply through a fuel injector valve is controlled based on result of said detection; the fuel supply system comprising:

valve-deterioration detection means for detecting deterioration of the fuel injector valve;

theoretical air-fuel ratio calculation means for calculating a theoretical air-fuel ratio, corresponding to the deterioration of the fuel injector valve, in accordance with a result of the detection by the valve-deterioration detection means;

actual air-fuel ratio detection means for detecting an actual air-fuel ratio by sensing an oxygen concentration in an exhaust gas from the internal combustion engine;

deviation calculation means for calculating a deviation of the calculated theoretical air-fuel ratio with respect to the detected actual air fuel ratio; and fuel supply control means for controlling the fuel supply amount using the result of deviation calculated by the deviation calculating means in addition to the operating condition of the internal combustion engine.

36. A fuel supply system for an internal combustion engine wherein an operating condition of the internal combustion engine is detected, and an amount of fuel supply through a fuel injector valve is controlled based on result of said detection; the fuel supply system comprising:

fuel nature sensor means for detecting nature of the fuel;

fuel-nature-sensor-deterioration detection means for detecting deterioration of the fuel nature sensor means;

theoretical air-fuel ratio calculation means for calculating a theoretical air-fuel ratio, corresponding to the nature of the fuel and the deterioration of the fuel nature sensor means, in accordance with results of the detections by said fuel nature sensor means and the fuel-nature-sensor-deterioration detection means;

actual air-fuel ratio detection means for detecting an actual air-fuel ratio by sensing an oxygen concentration in an exhaust gas from the internal combustion engine;

deviation calculation means for calculating a deviation of the calculated theoretical air-fuel ratio with respect to the detected actual air fuel ratio; and fuel supply control means for controlling the fuel supply amount using the result of deviation calculated by the deviation calculating means in addition to the operating condition of the internal combustion engine.

37. A fuel supply system for an internal combustion engine wherein an operating condition of the internal combustion engine is detected, and an amount of fuel supply through a fuel injector valve is controlled based on result of said detection; the fuel supply system comprising:

fuel nature sensor means for detecting a part of nature of the fuel;

theoretical air-fuel ratio calculation means for calculating a theoretical air-fuel ratio, corresponding to the part of the nature of the fuel, in accordance with a result of the detection by the fuel nature sensor means;

actual air-fuel ratio detection means for detecting an actual air-fuel ratio by sensing an oxygen concentration in an exhaust gas from the internal combustion engine;

deviation calculation means for calculating a deviation of the calculated theoretical air-fuel ratio with respect to the detected actual air fuel ratio; and fuel supply control means for controlling the fuel supply amount using the result of deviation calculated by the deviation calculating means in addition to the operating condition of the internal combustion engine.

38. A fuel injection device comprising a fuel injection valve fixedly mounted on an intake pipe so as to inject at least one jet of atomized fuel toward an intake valve; and direction control means for controlling the direction of injection of said atomized fuel jet from said fuel injection valve in at least one of an idling condition, a low-load operating condition and a high-load operating condition of an engine, said direction control means directing said atomized fuel jet, in said idling condition, toward a generally half side surface of said intake valve facing an ignition plug.

39. A fuel injection device according to claim 38, in which said direction control means controls the direction of injection of said atomized fuel jet in said idling condition.

* * * * *